United States Patent
Deshbhratar et al.

(10) Patent No.: US 11,768,649 B2
(45) Date of Patent: Sep. 26, 2023

(54) METHOD AND ELECTRONIC DEVICE FOR PROJECTING EVENT INFORMATION ON REFLECTOR DEVICE CONNECTED TO ELECTRONIC DEVICE

(71) Applicant: SAMSUNG ELECTRONICS CO., LTD., Suwon-si (KR)

(72) Inventors: Anand Deshbhratar, Noida (IN); Mayank Meghawat, Noida (IN); Vijayanand Kumar, Noida (IN); Vidushi Chaudhary, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/397,445

(22) Filed: Aug. 9, 2021

(65) Prior Publication Data
US 2022/0043619 A1    Feb. 10, 2022

(30) Foreign Application Priority Data

Aug. 10, 2020 (IN) .............................. 202041034292
Nov. 5, 2020 (KR) ........................ 10-2020-0147166

(51) Int. Cl.
*G06F 3/14* (2006.01)
*G06T 7/70* (2017.01)
(Continued)

(52) U.S. Cl.
CPC .................. *G06F 3/14* (2013.01); *G06T 7/70* (2017.01); *G06V 30/274* (2022.01); *G06V 40/10* (2022.01);
(Continued)

(58) Field of Classification Search
CPC ... G06F 3/14; G06T 7/70; G06T 2207/30196; G06V 40/10; G06V 30/274; H04N 5/232
(Continued)

(56) References Cited

U.S. PATENT DOCUMENTS 8,743,051 B1 *  6/2014  Moy ..................... H04N 7/141
                                                    345/156
2010/0182265 A1   7/2010  Kim et al.
(Continued)

FOREIGN PATENT DOCUMENTS

EP          2631743 A2     8/2013
KR    10-2013-0120835 A    11/2013
(Continued)

OTHER PUBLICATIONS

International Search Report dated Nov. 23, 2021 by the International Searching Authority in International Application No. PCT/KR2021/010528.
(Continued)

*Primary Examiner* — Jin Ge
(74) *Attorney, Agent, or Firm* — Sughrue Mion, PLLC

(57) ABSTRACT

A method for operating an electronic device includes: based on detection of an event, activating at least one reflector device connected to the electronic device; controlling the at least one reflector device to have an angle with respect to the electronic device such that a view position of a user is placed on the at least one reflector device; and controlling to display, on a display of the electronic device, event information associated with the detected event to be reflected to the at least one reflector device.

16 Claims, 22 Drawing Sheets

(51) Int. Cl.
  *G06V 30/262* (2022.01)
  *G06V 40/10* (2022.01)
  *H04N 23/60* (2023.01)
(52) U.S. Cl.
  CPC ... *H04N 23/60* (2023.01); *G06T 2207/30196* (2013.01)
(58) Field of Classification Search
  USPC .......................................................... 435/672
  See application file for complete search history.

(56) References Cited

U.S. PATENT DOCUMENTS

| | | | |
|---|---|---|---|
| 2013/0148002 A1 | 6/2013 | Kim et al. | |
| 2017/0206691 A1* | 7/2017 | Harrises | G06T 11/60 |
| 2017/0236298 A1* | 8/2017 | Vetter | H04N 5/23216 348/77 |
| 2018/0131801 A1* | 5/2018 | Gärdenfors | G06F 1/1626 |
| 2019/0110018 A1* | 4/2019 | Adams | H04N 5/7491 |
| 2019/0155475 A1 | 5/2019 | Sang et al. | |
| 2019/0285904 A1 | 9/2019 | Kim et al. | |
| 2020/0218313 A1 | 7/2020 | La et al. | |

FOREIGN PATENT DOCUMENTS

| | | | | |
|---|---|---|---|---|
| KR | 10-2014-0095246 A | | 8/2014 | |
| KR | 20140095246 | * | 8/2014 | ........... G06F 1/1613 |
| KR | 20-0485618 Y1 | | 2/2018 | |

OTHER PUBLICATIONS

Written Opinion dated Nov. 23, 2021 by the International Searching Authority in International Application No. PCT/KR2021/010528.
http://holhocollection.com/, website for HOLHOCOLLECTION, product by COSPE SAS, HOLHO—3d Hologram and Holographic devices.
https://www.ireviews.com/review/holus; Holus Review by Michael J. Marquis, Dec. 19, 2016.
https://www.ireviews.com/review/holho-4faces-display, Holho 4Faces Review by Michael J. Marquis, Apr. 19, 2017.
http://holhocollection.com/video-mobile/, website for HOLHOCOLLECTION, product by COSPE SAS, HOLHO—3d Hologram and Holographic devices.
https://www.youtube.com/watch?v=u2udUnF_spl, "Large hologram pyramid," Glimm Display, Jun. 9, 2017.
https://www.irishmirror.ie/lifestyle/technology/could-holographic-televisions-next-big-8897419, "Could holographic televisions be the next big thing? BBC creates amazing experimental device," Kara O'Neill, Sep. 23, 2016.
https://www.youtube.com/watch?v=fLRbAluZncA, "3D Holographic Pyramid 4x4mt ideastech.it," Ideastech, Jan. 6, 2017.
https://www.youtube.com/watch?v=dppCXj11l_Q, "Pepper's Cone: An Inexpensive Do-It-Yourself 3D Display," ACM SIGCHI, Dec. 14, 2017.
https://www.youtube.com/watch?v=FVYoWsxqK8g, "Voxon VX1 3D Volumetric Display—Demonstration," Voxon Photonics, Apr. 26, 2018.
https://www.youtube.com/watch?v=DCeZpW8b9J8, "Tokyo Game Show 2018—3D Holographic Gaming," Voxon Photonics, Oct. 4, 2018.
Communication dated Feb. 18, 2022 by the Intellectual Property India in Indian Application No. 202041034292.

* cited by examiner

METHOD AND ELECTRONIC DEVICE FOR PROJECTING EVENT INFORMATION ON REFLECTOR DEVICE CONNECTED TO ELECTRONIC DEVICE

CROSS REFERENCE TO RELATED APPLICATION(S)

This application is based on and claims priority from Indian Complete Patent Application No. 202041034292, filed on Aug. 10, 2020, in the Indian Patent Office, and Korea Patent Application No. 10-2020-0147166, filed on Nov. 5, 2020, in the Korean Intellectual Property Office, the disclosures of which are incorporated by reference herein in their entireties.

BACKGROUND

1. Field

The disclosure relates to a projection method and device, and more particularly, to a method and an electronic device for projecting information of an event on a reflector device connected to the electronic device.

2. Description of Related Art

When a user of an electronic device detects or receives an event (e.g., incoming call, message or the like) and information of the event is provided, an angle of view of the user of the electronic device and a viewing angle of the electronic device are not in the same line of sight so that the user of the electronic device is not able to view the information of the event properly. In an example, a smart phone receives an incoming call and the angle of view of the user of the smart phone and the viewing angle of the smart phone is not in the same line of sight, so that the user of the smart phone rushes to answer the incoming call and may be disappointed when the incoming call is not important. This may result in deteriorating the user experience in using the electronic device.

SUMMARY

Provided are a method and an electronic device for projecting an event on a reflector device connected to the electronic device without using any additional hardware setup.

In accordance with an aspect of the disclosure, there is provided is a method for operating an electronic device, including: based on detection of an event, activating at least one reflector device connected to the electronic device; controlling the at least one reflector device to have an angle with respect to the electronic device such that a view position of a user is placed on the at least one reflector device; and controlling to display, on a display of the electronic device, event information associated with the detected event to be reflected to the at least one reflector device.

The activating may include automatically activating the at least one reflector device based on a determination that an angle of view of the user of the electronic device and a viewing angle of the electronic device are not in the same line of sight.

The method may further include: automatically activating at least one image sensor of the electronic device; capturing at least one image frame of a reflection projected on the at least one reflector device; and determining whether an image of the user is included in the captured at least one image frame.

The method may further include: based on a determination that the image of the user is included in the captured at least one image frame, determining an angle of the at least one reflector device, with respect to the electronic device, at which the view position of the user is captured in the at least one reflector device; configuring the at least one reflector device based on the determined angle.

The method may further include: based on a determination that the image of the user is not included in the captured at least one image frame, modifying a position of the at least one reflector device; and capturing at least one another image frame of the reflection projected on the at least one reflector device at the modified position, determining an angle of the at least one reflector device, with respect to the electronic device, at which a reflection of the user is captured on the at least one reflector device, and configuring the at least one reflector device based on the determined angle.

The determining the angle may include: estimating a view projection contour of at least one body part of the user by using a machine learning model; estimating a projection location of the at least one body part of the user by using the machine learning model; and determining the angle based on the estimated view projection contour and the estimated projection location.

The controlling to display the event information may include: determining a display area of the display on which the event information is to be displayed on the at least one reflector device; and displaying the event information at the determined display area of the display.

The method may further include: reflecting the displayed event information in the display area to the at least one reflector device.

The displaying the event information may include: identifying at least one context information of the user; determining a level of the event information to be reflected on the at least one reflector device based on the at least one context information of the user; and displaying the level of the event information on the display area of the display.

The identifying the at least one context information may include identifying the at least one context information based on at least one of a presence of another user in proximity to the user, a relation between the user and the another user, a type of the event received at the electronic device, a location of the user, a location of the electronic device, or a preference of the user.

In accordance with an aspect of the disclosure, there is provided is an electronic device, including: at least one memory configured to store instructions; and at least one processor configured to execute the instructions to: based on detection of an event, control to activate at least one reflector device connected to the electronic device; control the at least one reflector device to have an angle with respect to the electronic device such that a view position of a user is placed on the at least one reflector device; and control to display, on a display of the electronic device, event information associated with the event to be reflected to the at least one reflector device.

The at least one processor may be further configured to execute the instructions to automatically activate the at least one reflector device based on a determination that an angle of view of the user and a viewing angle of the electronic device are not in the same line of sight.

The at least one processor may be further configured to execute the instructions to: automatically activate at least one image sensor; capturing at least one image frame of a reflection projected on the at least one reflector device; and determining whether an image of the user is included in the captured at least one image frame.

The at least one processor may be further configured to execute the instructions to: based on a determination that the image of the user is included in the captured at least one image frame, determine an angle of the at least one reflector device, with respect to the electronic device, at which the view position of the user is captured in the at least one reflector device; and control to configure the at least one reflector device based on the determined angle.

The at least one processor may be further configured to execute the instructions to: based on a determination that the image of the user is not included in the captured at least one image frame, modify a position of the at least one reflector device such that the reflection of the user is captured on the at least one reflector device; capture at least one another image frame of a reflection projected on the at least one reflector device at the modified position; determine an angle of the at least one reflector device, with respect to the electronic device, at which a reflection of the user is captured in the at least one reflector device; and control to configure the at least one reflector device based on the determined angle.

The at least one processor may be further configured to execute the instructions to: estimate a view projection contour of at least one body part of the user by using a machine learning model; estimate a projection location of the at least one body part of the user by using the machine learning model; and determine the angle based on the estimated view projection contour and the estimated projection location.

The at least one processor may be further configured to execute the instructions to: determine a display area of the display on which the event information received in the electronic device is to be displayed; and display the event information on the determined display area of the display.

The at least one processor may be further configured to execute the instructions to: reflect the displayed event information in the display area to the at least one reflector device.

The at least one processor may be further configured to execute the instructions to: detect at least one context information of the user; determine a level of the event information to be reflected on the at least one reflector device based on the at least one context information of the user; and display the level of the event information on the display area of the display.

The at least one processor may be further configured to execute the instructions to determine the at least one context information of the user based on at least one of a presence of another user in proximity to the user of the electronic device, a relation between the user of the electronic device and the another user, a type of the event received at the electronic device, a location of the user of the electronic device, a location of the electronic device, or a preference of the user of the electronic device.

BRIEF DESCRIPTION OF FIGURES

The above and other aspects, features, and advantages of certain embodiments of the present disclosure will be more apparent from the following description taken in conjunction with the accompanying drawings, in which.

DETAILED DESCRIPTION

Figure 1A:
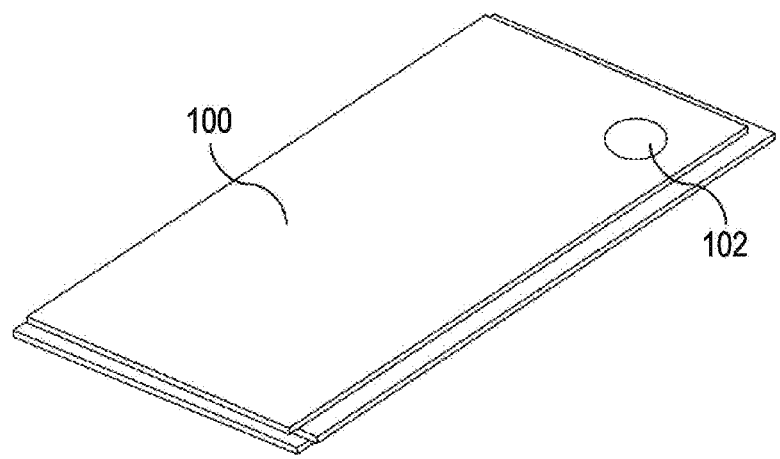
FIGS. 1A, 1B, 1C and 1D illustrate an example in which an electronic device projects an event on a reflector device connected to the electronic device, according to various embodiments.
Figure 1B:
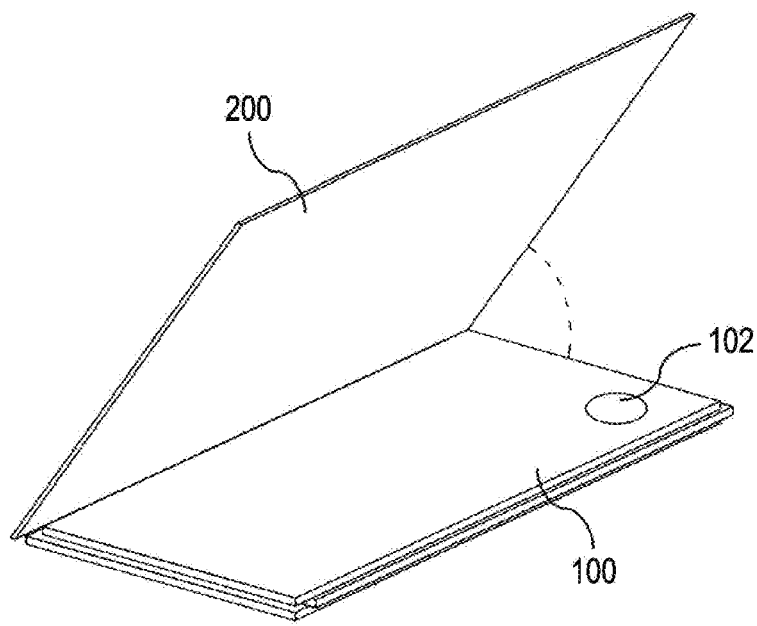

The embodiments and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments may be practiced and to further enable those skilled in the art to practice the embodiments. Accordingly, the examples should not be construed as limiting the scope of the embodiments.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, various embodiments may achieve a method for projecting information of an event on a reflector device connected to an electronic device. The method may include detecting, by the electronic device, the event in the electronic device. Further, the method may include activating, by the electronic device, the reflector device connected to the electronic device in response to detecting the event. Further, the method may include automatically configuring, by the electronic device, the reflector device at an angle at which a view position of a user of the electronic device is captured (or appears) on the reflector device. Here, the term "view position" is used to refer to a position of a gaze point of the user's eye. Further, the method may include displaying, by the electronic device, information of the event received in the electronic device on the reflector device.

The method according to various embodiments may be used to activate the reflector device connected to the electronic device after detecting an event in the electronic device. According to various embodiments, the reflector device may be automatically activated when an angle of view of a user (e.g., an extent of a scene that can be viewed by a user) of the electronic device is out of a viewing angle of the electronic device (e.g., an angular range defined by a plurality of viewing directions at which a display of the electronic device can be viewed by the user). For example, the reflector device may be automatically activated when an angle of view of the user of the electronic device is not in the same line of sight with the viewing angle of the electronic device. After activating the reflector device, the electronic device may automatically adjust the reflector device at the angle at which a view position (e.g., a position of a gaze point) of the user of the electronic device is captured on the reflector device using an image sensor, such that the electronic device displays the information of the event received in the electronic device on the reflector device. This results in enhancing the user experience without using any additional hardware elements. The event may be easily viewed without lifting the electronic device and immersive experience may be obtained for viewing the event with cheapest of setup.

The method according to various embodiments may be used to improve the user experience by projecting a two dimensional (2D) or a three dimensional (3D) image by capturing reflection on the reflector device in a low cost manner. The proposed method may be used to retrieve the information easily from the electronic device.

In an example, in the existing method, a smart phone receives an incoming call and the angle of view of the user of the smart phone and the viewing angle of the smart phone is not in same line of sight, so that the user of the smart phone would rush to pick the smart phone to receive the incoming call and may be disappointed when the incoming call is not important. This may result in deteriorating the user experience in utilizing the smart phone. According to various embodiments, upon detecting an event such as receiving the incoming call, the reflector device such as transparent glass may be automatically activated when the angle of view of the user of the smart phone and the viewing angle of the smart phone are not in the same line of sight. Thus, the smart phone may activate a transparent glass connected to the electronic device since. After activating the transparent glass, the smart phone may automatically adjust the transparent glass at the angle at which the view position of the user of the smart phone captured on the transparent glass using a camera, such that the smart phone may display the information of the incoming call received in the smart phone on the transparent glass. This may result in enhancing the user experience.

Referring now to the drawings, and more particularly to FIGS. 1A through 18C, example embodiments are described in detail.

FIGS. 1A, 1B, 1C and 1D illustrate examples in which an electronic device 100 projects information of an event (hereinafter "event information") on a reflector device 200 connected to the electronic device 100, according to various embodiments. The electronic device 100 may be, for example but not limited to, a cellular phone, a smart phone, a personal digital assistant (PDA), a tablet computer, a laptop computer, an Internet of Things (IoT), a virtual reality device, a smart phone, a flexible electronic device, a curved electronic device, a foldable electronic device, or the like. The reflector device 200 may be, for example but not limited to, a transparent cover, an elevated cover, a phone case, a tempered glass, a prism, multisided inclined glass for multi side view, or the like and may include any object onto which the event information is projected.

The electronic device 100 may detect an event. The event may be, for example but not limited to, an incoming call, a notification message, an alarm, a battery status indication, reminder notification, a health data display notification, a live streaming notification, a music related notification, a calendar notification, a weather notification, and a gaming related notification. After detecting the event, the electronic device 100 may activate the reflector device 200 connected to the electronic device 100. The reflector device 200 may be automatically activated when an angle of view of a user (e.g., a user 300 of the electronic device 100) and a viewing angle of the electronic device 100 are not in the same line of sight. Hereinafter, for illustrative purposes, it is described that the reflector device 200 may be automatically activated when the angle of view of the user is not in the same line of sight with the viewing angle of the electronic device 100, but the disclosure is not limited thereto. For example, the reflector device 200 may be automatically activated when the angle of view of the user is out of a viewing angle of the electronic device 100 (e.g., an angular range defined by a plurality of viewing directions at which a display of the electronic device can be viewed by the user).

Further, the electronic device 100 may automatically configure the reflector device 200 to have an angle with respect to the electronic device 100 so that a view position (e.g., a position of a user's gaze point) of the user (e.g., the user 300 of the electronic device 100) is positioned on the reflector device 200. The electronic device 100 may utilize various configurations for automatically configuring the reflector device 200 at the angle at which the view position of the user (e.g., the user 300 of the electronic device 100) is captured on the reflector device 200. Operations and functions of the various configurations may be implemented with methods described later with reference to FIG. 13A to FIG. 18C. The reflector device 200 may move from one position to another position with respect to the electronic device 100 so as to estimate an optimal angle of the reflector device 200 such that user's viewpoint may be captured optimally (e.g., the user's viewpoint may be located around a center position of the reflector device 200). The user viewpoint may be in a standing position or a sitting position, and the reflector device 200 may be in a flexible form so as to move around the electronic device 100 (e.g., rotate at no less than a certain angle (e.g., 180 degree)). In an example, the reflector device 200 is positioned parallel to the electronic device 100 as shown in the FIG. 3A, and the reflector device 200 may rotate to be positioned with respect to the electronic device 100 at 180 degree as shown in the FIG. 3B. As shown in the FIG. 3C, the reflector device 200 may be positioned with respect to the electronic device 100 at a certain distance at a specified angle (e.g., 90 degree) based on the activating the camera.

In an embodiment, the electronic device 100 may automatically activate an image sensor 102 of the electronic device 100. The image sensor 102 may be, for example but not limited to, a camera. After activating the image sensor 102 of the electronic device 100, the electronic device 100 may capture an image frame of a reflection projected on the reflector device 200. Based on capturing the image frame of the reflection projected on the reflector device 200, the electronic device 100 may determine whether an image of the user is available in the reflection projected on the reflector device 200 (e.g., whether an image of the user is included in the reflection projected on the reflector device 200). If the user is available in the reflection projected on the reflector device 200, the electronic device 100 determines a view position of the user (e.g., the user 300 of the electronic device 100) based on the image frame of the reflection projected on the reflector device 200. Further, the electronic device 100 may determine an angle at which the view position of the user (e.g., the user 300 of the electronic device 100) is captured in the reflector device 200 and automatically configure the reflector device 200 based on the determined angle, as shown in the FIG. 12A.

Figure 12A:
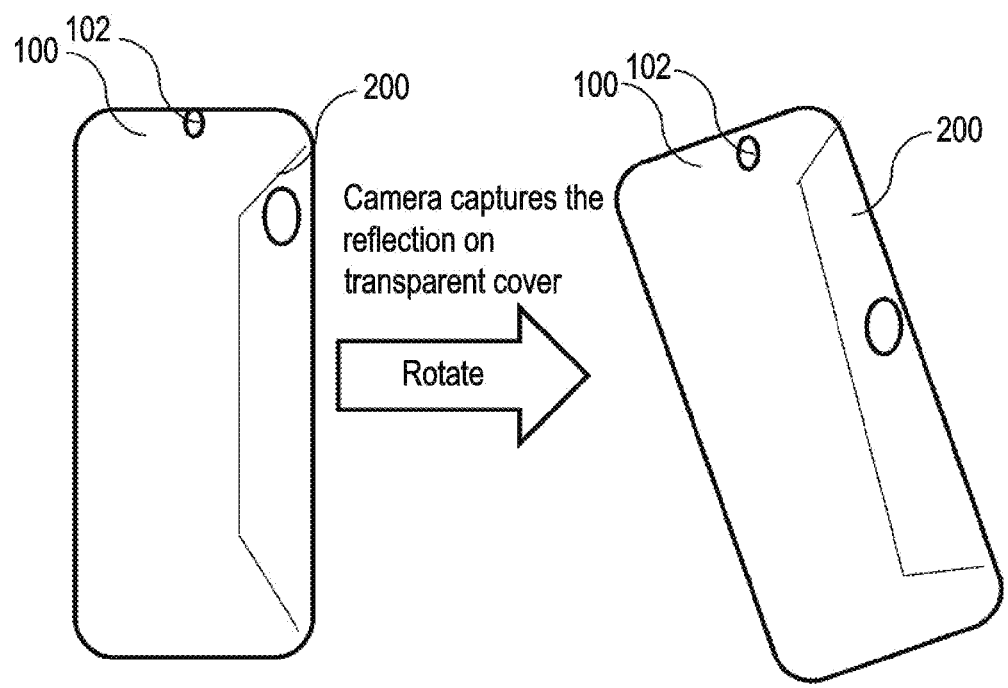
FIG. 12A illustrates an example in which an electronic device determines an optimal view position of a user on a reflector device by rotating the electronic device, according to various embodiments.
Figure 12B:
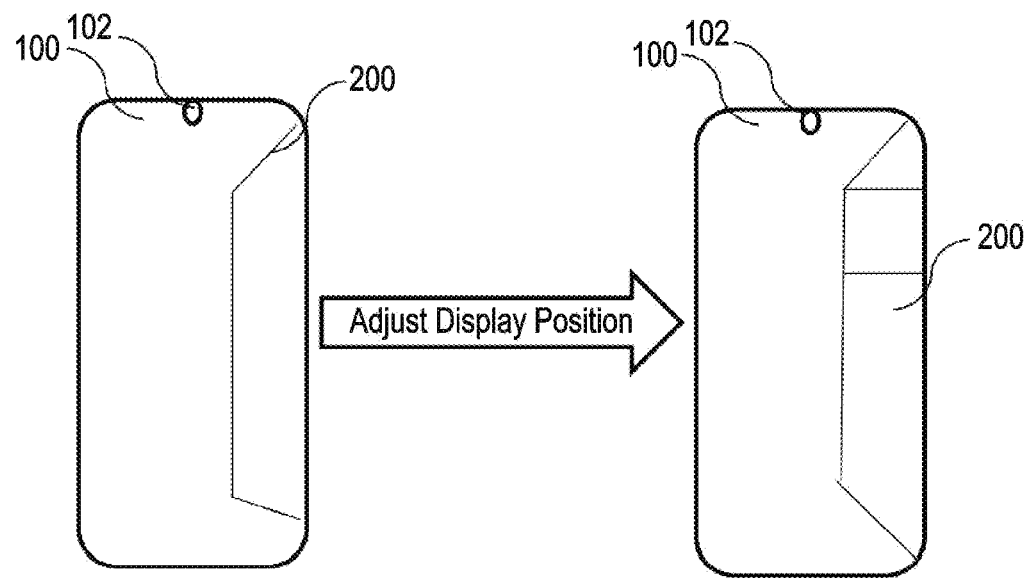
FIG. 12B illustrates an example in which an electronic device determines a better view on a reflector device by adjusting a display area of an electronic device, according to various embodiments.

If the image of the user (e.g., the user 300 of the electronic device 100) is not available in the reflection projected on the reflector device 200, then the electronic device 100 modifies a position of the reflector device 200 such that the reflection of the user (e.g., the user 300 of the electronic device 100) is captured on the reflector device 200 as shown in the FIG. 12B.

If the image of the user (e.g., the user 300 of the electronic device 100) is not available in the reflection projected on the reflector device 200, then the electronic device 100 may capture another image frame of a reflection projected on the reflector device 200 at the modified position of the reflector device 200, determine an angle at which the reflection of the user (e.g., the user 300 of the electronic device 100) is captured in the reflector device 200, and automatically configure the reflector device 200 based on the determined angle.

According to various embodiments, the angle at which the reflection of the user 300 of the electronic device 100 is captured in the reflector device 200 may be determined by estimating a view projection contour of a body part of the user (e.g., the user 300 of the electronic device 100) using a machine learning model, estimating a projection location of the body part of the user (e.g., the user 300 of the electronic device 100) using the machine learning model, and determining the angle based on the view projection contour and the projection location. The body part may be, for example, an eye, a face, and head, but not limited thereto.

Further, the electronic device 100 may display information (hereinafter, referred to as 'event information' for convenience of explanation) associated with the event received in the electronic device 100, on the reflector device 200. In an embodiment, the electronic device 100 may determine a display area of a display 108 of the electronic device 100 at which the event information associated with the event received in the electronic device 100 is to be displayed on the reflector device 200. Further, the electronic device 100 may display the information of the event in the display area of the display 108 of the electronic device 100 and reflect the event information in the display area to the reflector device 200. The reflection of the event information in the display area may reflect the information of the event at the angle of view of the user (e.g., the user 300 of the electronic device 100).

According to various embodiments, the event information of the event in the display area of the display 108 of the electronic device 100 may be displayed by detecting a context (or identifying context information) of the user (e.g., the user 300 of the electronic device 100), determining a level of information of the event to be reflected on the electronic device 100 based on the context of the user, and displaying the level of the event information in the display area of the electronic device 100.

The context of the user 300 may be determined based on, for example, a presence of another user 300*a* in proximity to the user of the electronic device 100, a relation between the user 300 of the electronic device 100 and the another user 300*b*, a type of the event received at the electronic device 100, a location of the user 300 of the electronic device 100, a location of the electronic device 100, and a preference of the user 300 of the electronic device 100. In an example, the type of the event may be a private call on the electronic device 100. In an example, if the user 300 is located in an office environment and the user 300 sets the content information of the user 300 such that the content of the event information is not to be shown to others in the office environment means, the electronic device 100 may accordingly display the content of the event information in a manner that corresponds to the office environment (that is, in such a manner that the content of the event information is not shown to others).

Figure 1C:
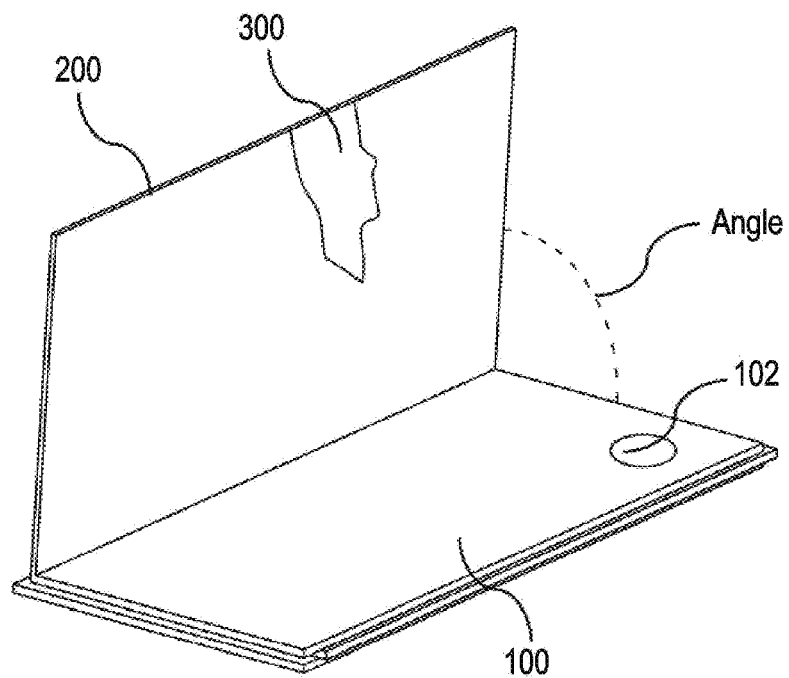
Figure 1D:
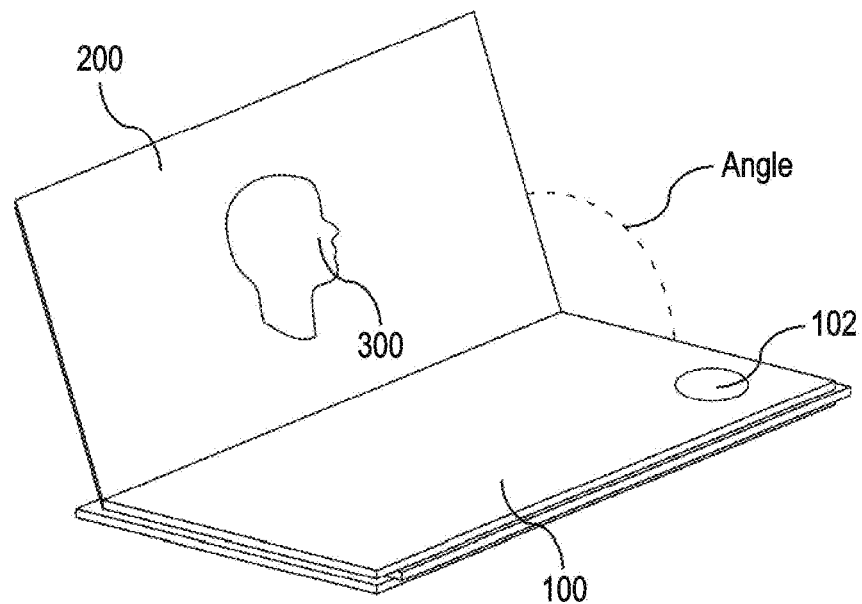

As shown in the FIG. 1A, the electronic device 100 may receive the incoming call. Based on receiving the incoming call, the electronic device 100 may detect that the angle of view of the user 300 of the electronic device 100 and the viewing angle of the electronic device 100 are not in the same line of sight, so that the electronic device 100 may activate the reflector device 200 connected to the electronic device 100 as shown in the FIG. 1B. As shown in FIG. 1C, the electronic device 100 may determine a view position of the user 300 of the electronic device 100 based on the image frame of the reflection projected on the reflector device 200. Further, the electronic device 100 may adjust the angle to capture an optimal view direction of the user 300 of the electronic device 100 based on the image frame of the reflection projected on the reflector device 200 as shown in the FIG. 1D. The optimal view direction may be determined by how close a projection of the user's view is center aligned on the reflector device 200.

Figure 2A:
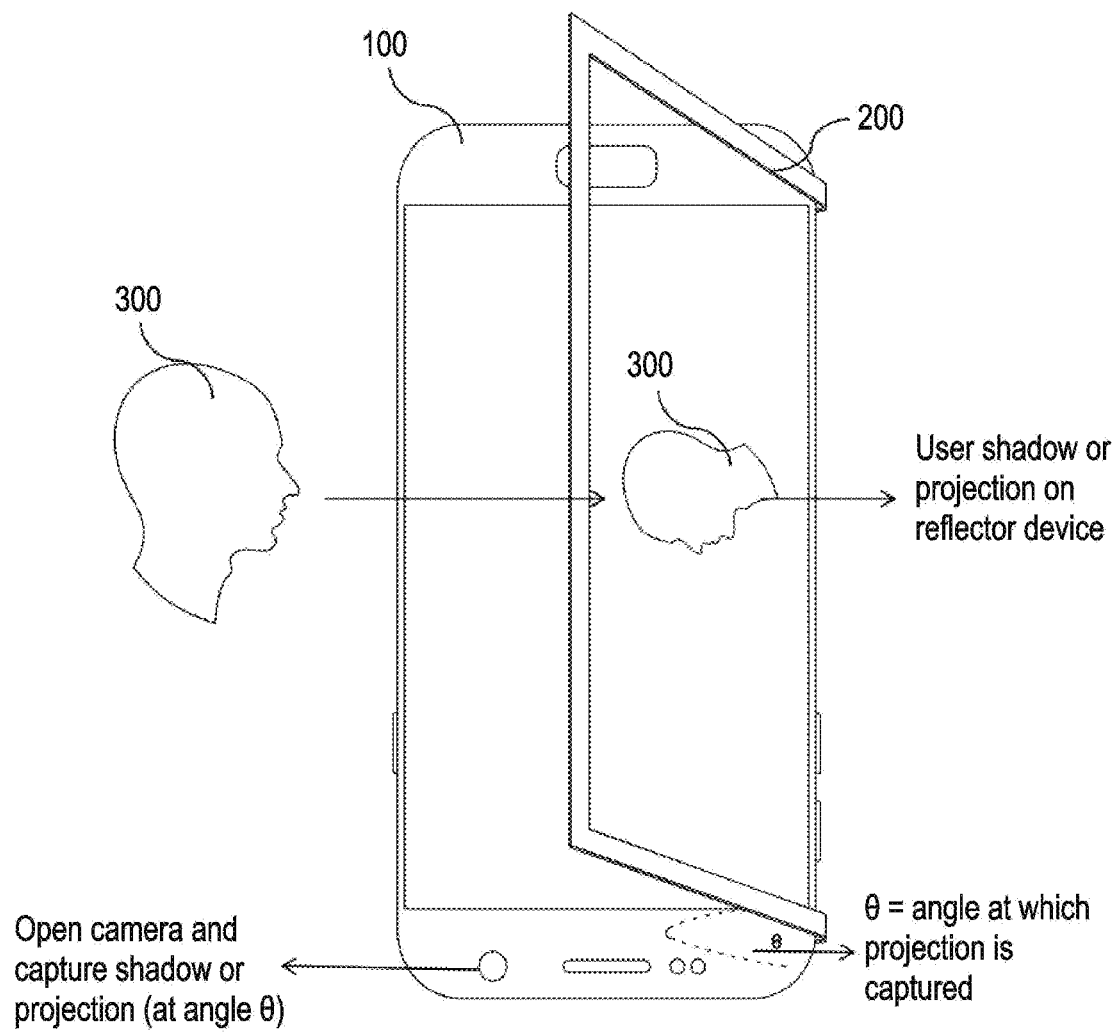
FIG. 2A illustrates an example in which an electronic device captures an optimal view position of a user, according to an embodiment.

FIG. 2A illustrates an example in which the electronic device 100 captures the optimal user's view position, according to various embodiments. The electronic device 100 may determine the user image projection on the reflector device 200. After determining the user image projection on the reflector device 200, the electronic device 100 may activate the image sensor 102 to capture the user image projection (at angle θ) on the reflector device 200.

Figure 2B:
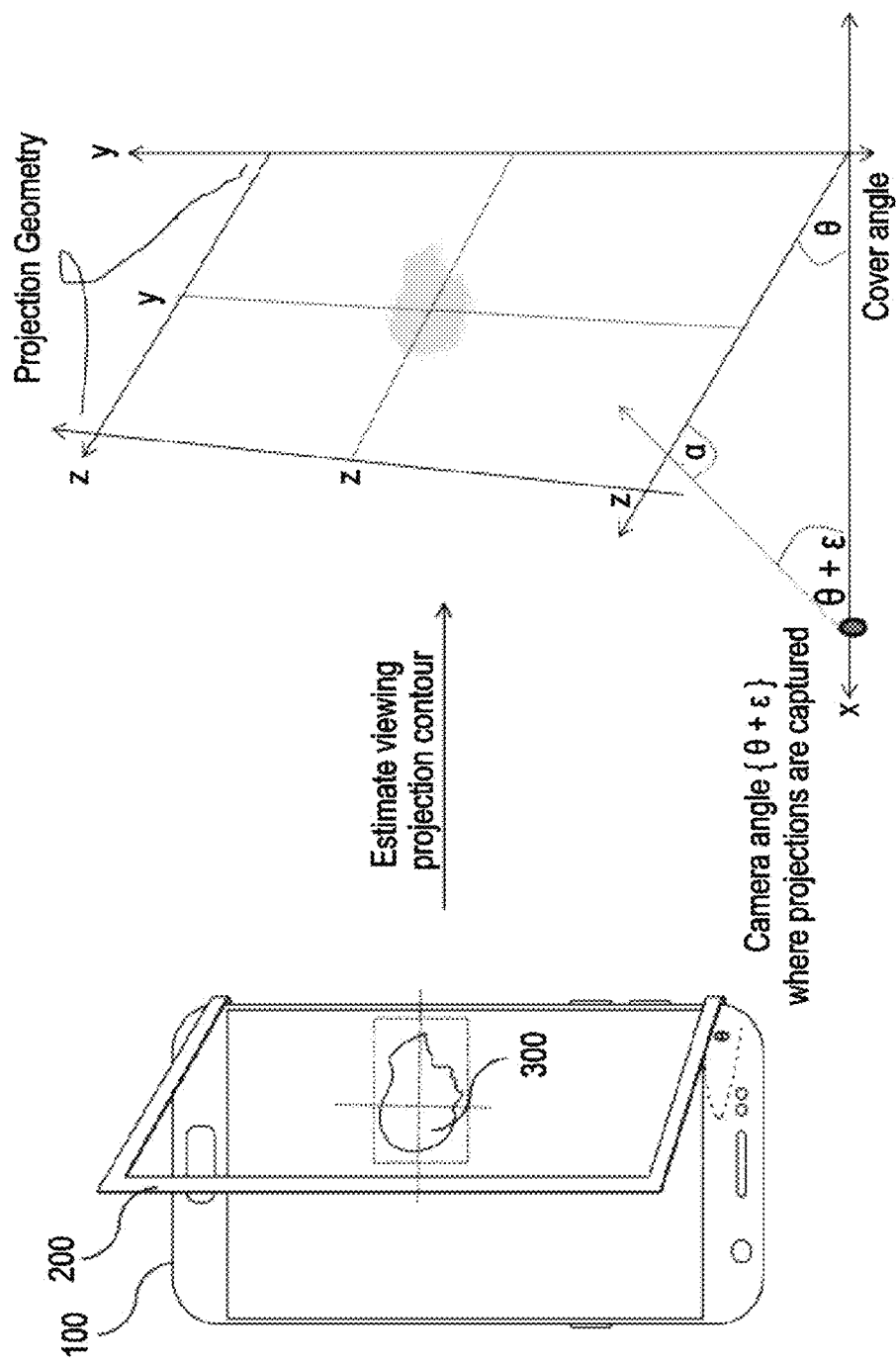
FIG. 2B illustrates an example in which an electronic device estimates a relative position of a user with respect to the electronic device, according to various embodiments.

FIG. 2B illustrates an example in which the electronic device 100 estimates a user's relative position with respect to the electronic device 100, according to various embodiments. The electronic device 100 may determine the angle formed by the reflector device 200 relative to the electronic device 100 and at which the reflection of the user 300 of the electronic device 100 has been captured on the reflector device 200, by estimating a view projection contour of a body part of the user 300 using a machine learning model and estimating a projection location of the body part of the user 300 using the machine learning model, and determining the angle based on the estimated view projection contour and the estimated projection location.

In an example, the camera may analyze the positions of the user and transmit a feedback to the image sensor for adjusting a transparent screen and/or surface of the reflector device 200 to appropriate direction(s). The appropriate direction(s) may be provided to the reflector device 200 as known and/or unknown variables (e.g., θ, £, a, etc.) as the feedback. The above operations may be repeated until a final appropriate direction is found. The changes of the direction of the reflector device 200 according to the known and/or unknown variables in the feedback may be performed based on existing methods. The changes according to the known and/or unknown variables may be made by using an upward or downward movement and/or rotation in an X, Y, and/or Z direction of the reflector device 200.

Figure 2C:
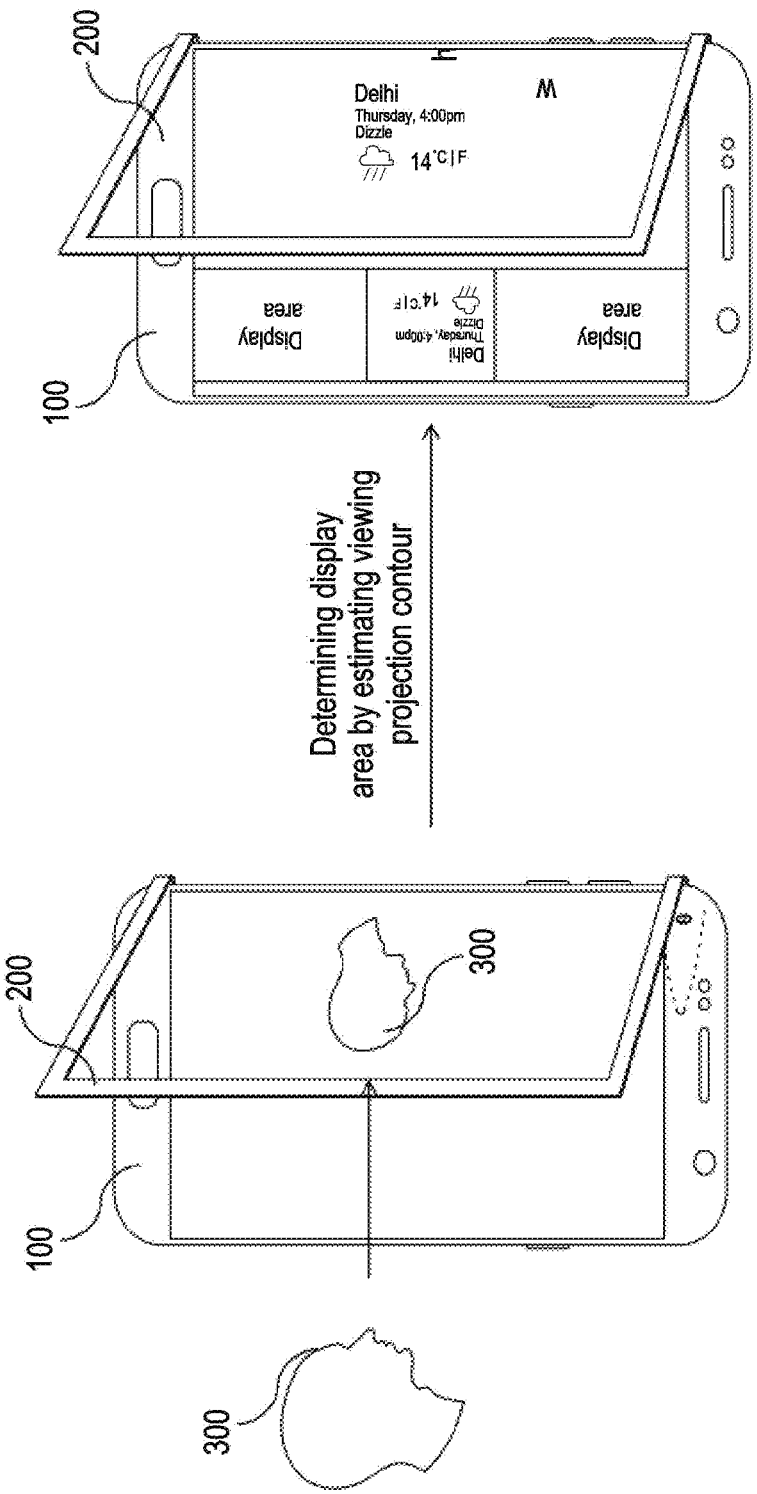
FIG. 2C illustrates an example in which an electronic device estimates a display area according to user's view location, according to various embodiments.
Figure 3A:
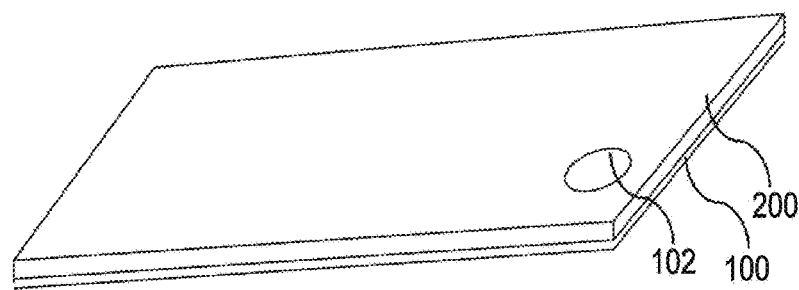
FIGS. 3A, 3B and 3C illustrate an example in which a reflector device change a position with respect to an electronic device, according to various embodiments.
Figure 3B:
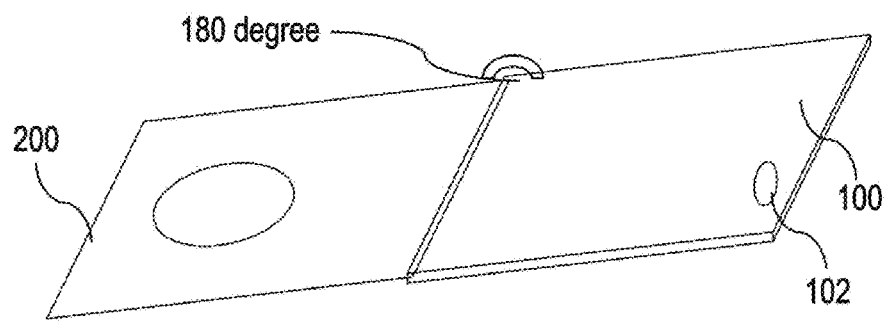
Figure 3C:
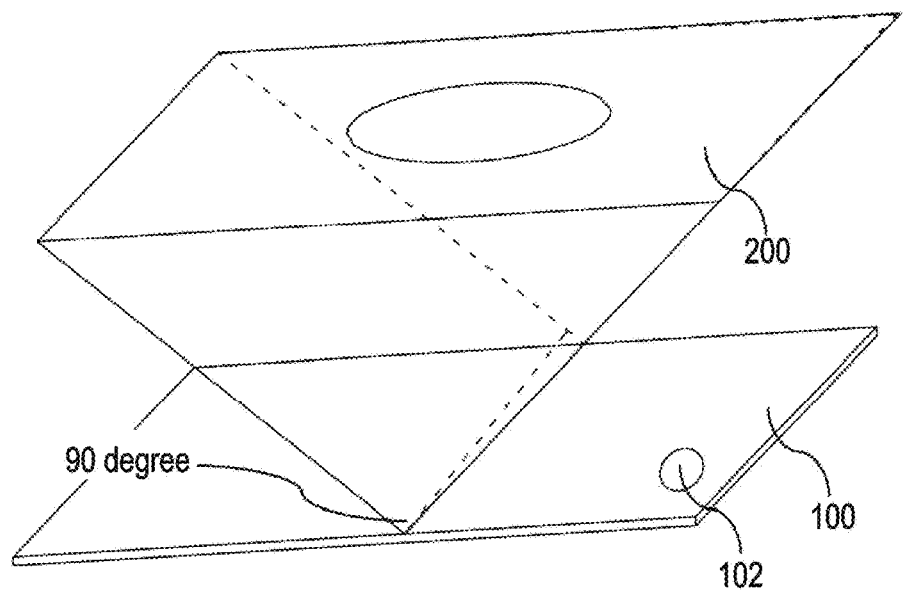

FIG. 2C illustrates an example in which the electronic device 100 estimates the display area according to a user's view location, according to various embodiments. The electronic device 100 determines the display area of the electronic device 100 at which the information of the event received in the electronic device 100 is to be displayed on the reflector device 200. Further, the electronic device 100 displays the information of the event in the display area of the electronic device 100 and reflects the display area in the reflector device 200. The reflection of the display area reflects the information of the event at the angle of view of the user 300 of the electronic device 100.

Figure 4:
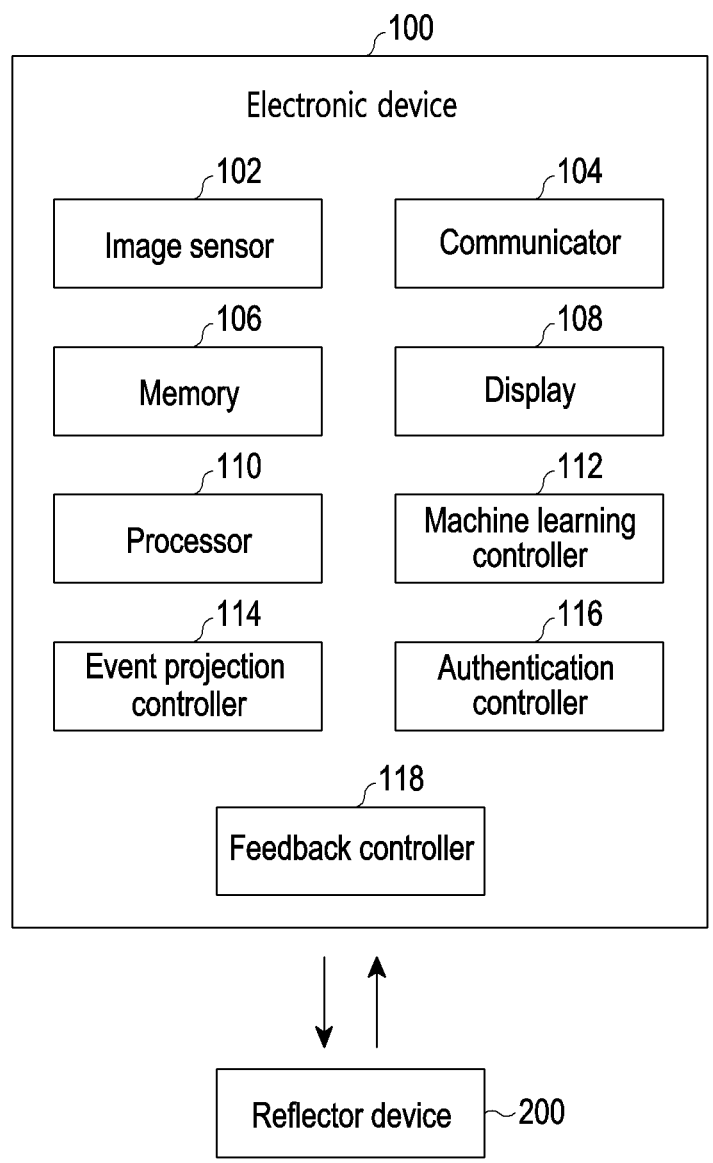
FIG. 4 illustrates various hardware components of an electronic device for projecting an event on a reflector device connected to the electronic device, according to various embodiments.

FIG. 4 illustrates various hardware components of the electronic device 100 for projecting the event information on the reflector device 200 connected to the electronic device 100, according to various embodiments. The electronic device 100 may include the image sensor 102, a communicator 104, a memory 106, the display 108 including a display area, a processor 110, a machine learning controller 112, an event projection controller 114, an authentication controller 116 and a feedback controller 118. The processor 110 may be connected via communication with the image sensor 102, the communicator 104, the memory 106, the display 108, the machine learning controller 112, the event projection controller 114, the authentication controller 116 and the feedback controller 118.

The event projection controller 114 may be configured to detect the event in the electronic device 100. After detecting the event, the event projection controller 114 may be configured to activate the reflector device 200 connected to the electronic device 100. The reflector device 200 may be automatically activated when the angle of view of the user (e.g., the user 300 of the electronic device 100) and the viewing angle of the electronic device 100 are not in the same line of sight. According to various embodiments, the detection of the event may be performed by the processor 110.

Further, the event projection controller 114 may automatically configure the reflector device 200 at an angle relative to the electronic device 100 such that the view position of the user (e.g., the user 300 of the electronic device 100) is positioned on the reflector device 200. In an embodiment, the event projection controller 114 may be configured to automatically activate the image sensor 102 of the electronic device 100 to capture the view position of the user. After activating the image sensor 102 of the electronic device 100, the event projection controller 114 may be configured to capture the image frame of the reflection projected on the reflector device 200. Based on capturing the image frame of the reflection projected on the reflector device 200, the event projection controller 114 may be configured to detect whether the user image is available in the reflection projected on the reflector device 200. If the user image is available in the reflection projected on the reflector device 200, the event projection controller 114 may be configured to determine the view position of the user 300 of the electronic device 100 based on the image frame of the reflection projected on the reflector device 200. Further, the event projection controller 114 may be configured to determine the angle at which the view position of the user (e.g., the user 300 of the electronic device 100) is captured on the reflector device 200 and automatically configure the reflector device 200 based on the determined angle.

According to various embodiments, if the image of the user (e.g., the user 300 of the electronic device 100) is not available in the reflection projected on the reflector device 200, then the event projection controller 114 may be configured to modify the position of the reflector device 200 (e.g., modify the angle of the reflector device 200 with respect to the electronic device 100) such that the reflection of the user (e.g., the user 300 of the electronic device 100) is captured on the reflector device 200.

If the image of the user (e.g., the user 300 of the electronic device 100) is not available in the reflection projected on the reflector device 200, then the event projection controller 114 may be configured to capture another image frame of a reflection projected on the reflector device 200 at the modified position of the reflector device 200, determine the angle at which the reflection of the user (e.g., the user 300 of the electronic device 100) is captured in the reflector device 200, and automatically configure the reflector device 200 to correspond to the determined angle.

According to various embodiments, the machine learning controller 112 and the event projection controller 114 may be configured to determine the angle at which the reflection of the user (e.g., the user 300 of the electronic device 100) is captured in the reflector device 200, by estimating the view projection contour of a body part of the user (e.g., the user 300 of the electronic device 100) using the machine learning model, estimating the projection location of the body part of the user (e.g., the user 300 of the electronic device 100) using the machine learning model, and determining the angle of the reflector device 200 with respect to the electronic device 100 based on the view projection contour and the projection location.

According to various embodiments, the event projection controller 114 may be configured to display information associated with the event received in the electronic device 100 on the reflector device 200.

In an embodiment, the event projection controller 114 may be configured to determine the display area of the display 108 of the electronic device 100 at which the information associated with the event received in the electronic device 100 is to be displayed on the reflector device 200. Further, the event projection controller 114 may be configured to display the information of the event in the display area of the display 108 and reflect the event information in the display area of the display 108 to the reflector device 200. The reflection on the reflector device 200 may reflect the information of the event at the angle of view of the user (e.g., the user 300 of the electronic device 100).

The event information in the display area of the display 108 of the electronic device 100 may be displayed by detecting a context (or identifying context information) of the user 300 by using the authentication controller 116, determining a level of information of the event to be reflected on the reflector device 200 based on the context of the user, and displaying the level of information of the event in the display area of the electronic device 100. The authentication controller 116 may use biometrics such as a shape of a face, a body shape, a gender (e.g., male, female), age (e.g., kids), etc. that may be used to identify the user. The reflection may be captured on the transparent glass of the reflector device 200 and the camera of the electronic device 100 captures the reflection and a biometrics for identifying a particular user may be extracted from the captured reflection. The user context may be distinguished in various ways such as voice recognition and techniques for identifying presence of one or more users, etc.

Further, the feedback controller 118 may be interacted between the reflector device 200 and the image sensor 102 to determine whether the optimal view position of the user 300 of the electronic device 100 is captured on the reflector device 200.

The processor 110 may be configured to execute instructions stored in the memory 106 and to perform various processes. The communicator 104 may be configured for communicating internally between internal hardware components and with external devices via one or more networks.

The memory 106 may also store instructions to be executed by the processor 110. The memory 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 106 may, in some examples, be considered a non-transitory storage medium. The term "non-transitory" may indicate that the storage medium is not embodied in a carrier wave or a propagated signal. However, the term "non-transitory" should not be interpreted that the memory 106 is non-movable. In some examples, the memory 106 may be configured to store larger amounts of information than the memory. In certain examples, a non-transitory storage medium may store data that may, over time, change (e.g., in Random Access Memory (RAM) or cache).

Further, at least one of the plurality of hardware components may be implemented through an artificial intelligent (AI) model. A function associated with AI may be performed through the non-volatile memory, the volatile memory, and the processor 110. The processor 110 may include one or a plurality of processors. One or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors may control the processing of the input data in accordance with a predefined operating rule or artificial intelligence (AI) model stored in the non-volatile memory and the volatile memory. The predefined operating rule or artificial intelligence model is provided through training or learning.

Here, being provided through learning may mean that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer may have a plurality of weight values, and perform a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the various embodiments. One or more components may be combined together to perform same or substantially similar function to project the event information on the reflector device 200 connected to the electronic device 100.

Figure 5A:
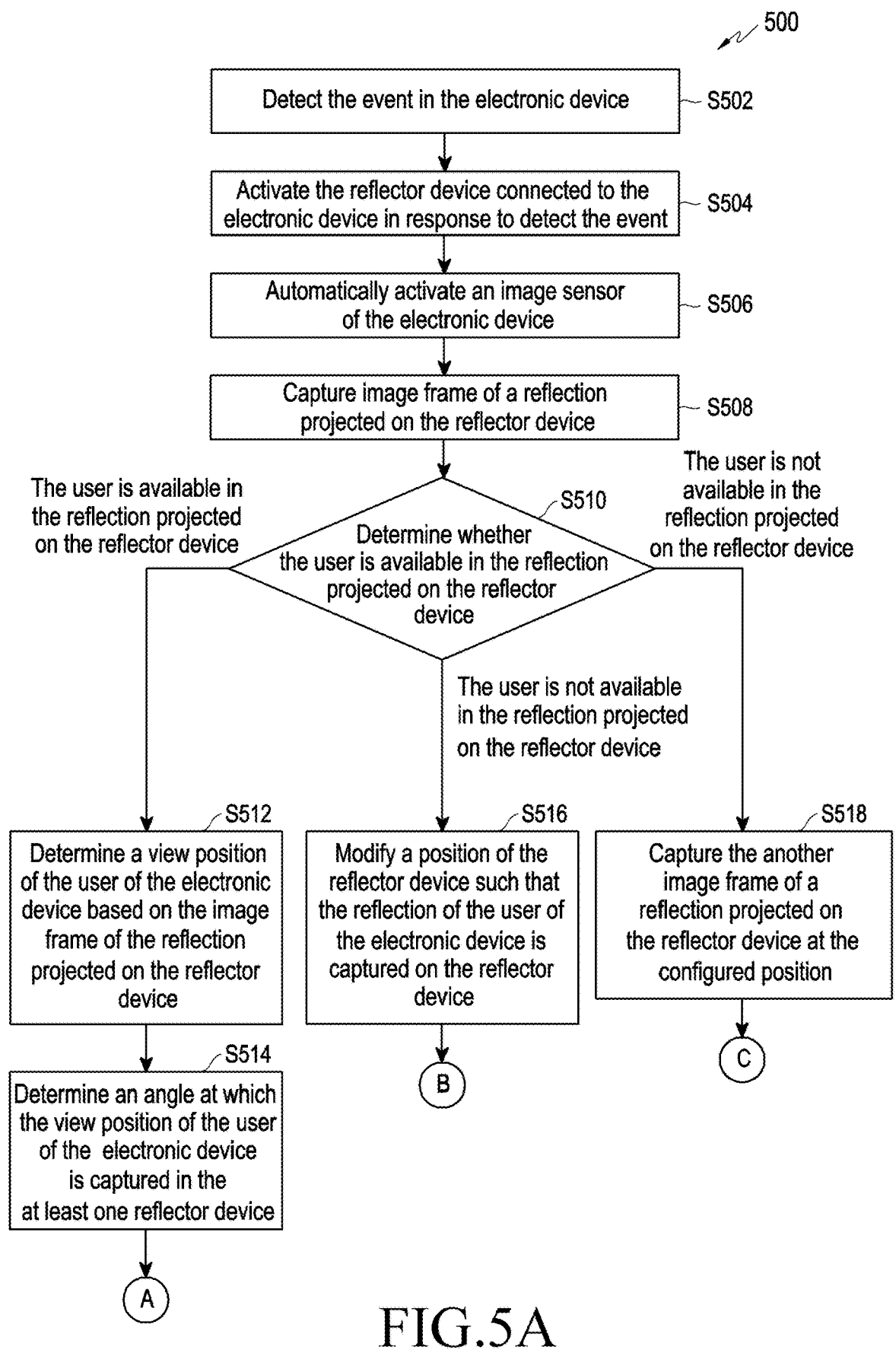
FIGS. 5A, 5B and 5C are each a flow chart illustrating a method for projecting an event on a reflector device connected to an electronic device, according to various embodiments.
Figure 5B:
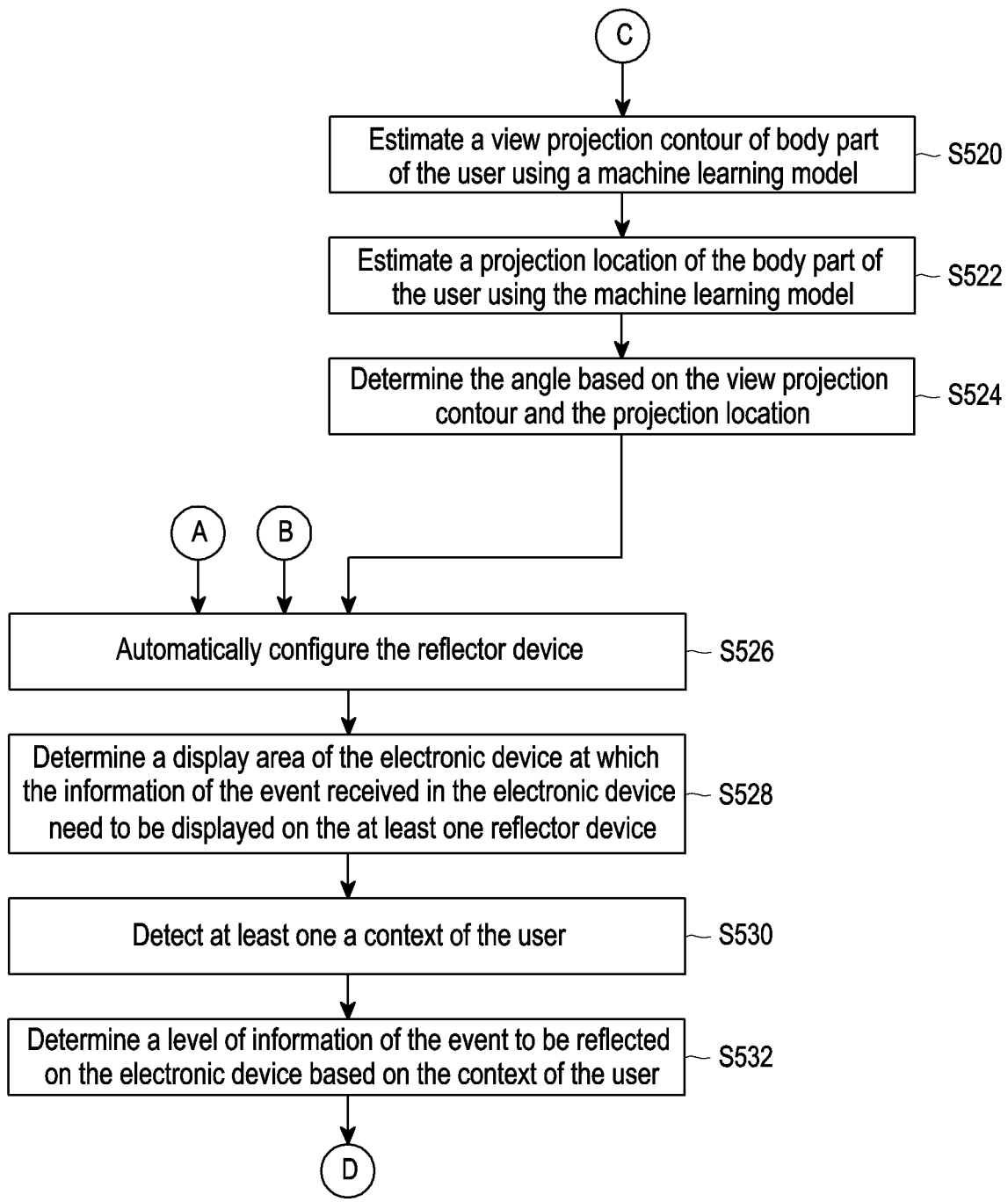
Figure 5C:
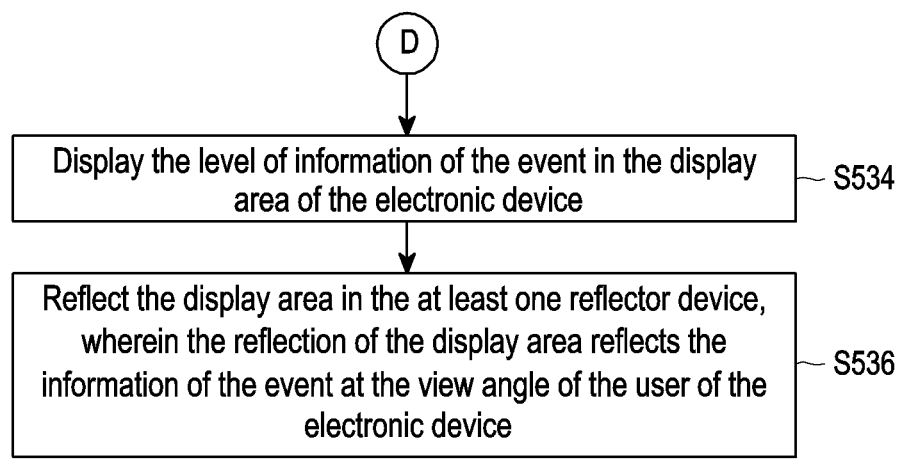

FIGS. 5A, 5B, and 5C illustrate a flow chart S500 of a method for projecting an event on the reflector device 200 connected to the electronic device 100, according to various embodiments. Operations S502 to S536 may be performed by the event projection controller 114.

At S502, the method may include detecting the event in the electronic device 100. At S504, the method may include activating the reflector device 200 connected to the electronic device 100 in response to detecting the event. At S506, the method may include automatically activating the image sensor 102 of the electronic device 100. At S508, the method may include capturing the image frame of the reflection projected on the reflector device 200. At S510, the method may include determining whether the user image is available in the reflection projected on the reflector device 200.

If the user image is available in the reflection projected on the reflector device 200, at S512, the method may include determining the view position of the user (e.g., the user 300 of the electronic device 100) based on the image frame of the reflection projected on the reflector device 200. At S514, the method may include determining the angle at which the view position of the user (e.g., the user 300 of the electronic device 100) is captured in the reflector device 200.

According to various embodiments, if the image of the user (e.g., the user 300 of the electronic device 100) is not available in the reflection projected on the reflector device 200, then, at S516, the method may include modifying a position of the reflector device 200 such that the reflection of the user (e.g., the user 300 of the electronic device 100) is captured on the reflector device 200.

If the image of the user (e.g., the user 300 of the electronic device 100) is not available in the reflection projected on the reflector device 200 then, at S518, the method may include capturing another image frame of the reflection projected on the reflector device 200 at the configured position.

At S520, the method may include estimating the view projection contour of a body part of the user (e.g., the user 300 of the electronic device 100) using the machine learning model. At S522, the method may include estimating the projection location of the body part of the user (e.g., the user 300 of the electronic device 100) using the machine learning model. At S524, the method may include determining the angle based on the view projection contour and the projection location.

At S526, the method may include automatically configuring the reflector device 200. At S528, the method may include determining the display area of the display 108 of the electronic device 100 at which the information (e.g., event information) associated with the event received in the electronic device 100 is to be displayed on the reflector device 200. At S530, the method may include detecting the context (e.g., identifying context information) of the user 300. At S532, the method may include determining the level of information of the event to be reflected on the electronic device 100 based on the context of the user. At S534, the method may include displaying the level of information of the event in the display area of the display 108 of the electronic device 100. At S536, the method may include reflecting the display area of the display 108 in the reflector device 200. The reflection of the display area reflects the information of the event at the angle of view of the user (e.g., the user 300 of the electronic device 100).

The various actions, acts, blocks, steps, or the like in the flow diagram S500 may be performed in the order presented, in a different order or simultaneously. Further, in some embodiments, some of the actions, acts, blocks, steps, or the like may be omitted, added, modified, skipped, or the like without departing from the scope of the disclosure.

Figure 6:
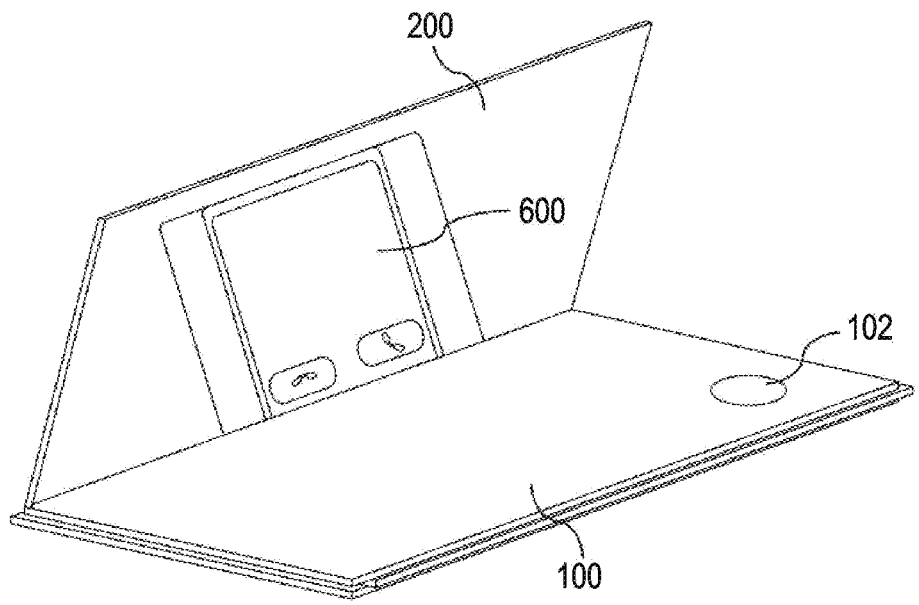
FIG. 6 illustrates an example in which an electronic device projects an incoming call event on a reflector device connected to the electronic device, according to various embodiments.

FIG. 6 illustrates an example in which the electronic device 100 projects an incoming call event 600 on the reflector device 200 connected to the electronic device 100, according to various embodiments. In this example, it may be assumed that the angle of view of the user (e.g., the user 300 of the electronic device 100) and the viewing angle of the electronic device 100 are not in the same line of sight and the electronic device 100 receives the incoming call. According to an example embodiment, upon receiving the incoming call 600, the electronic device 100 may activate the reflector device 200 connected to the electronic device 100 since the reflector device 200 is automatically activated when the angle of view of the user (e.g., the user 300 of the electronic device 100) and the viewing angle of the electronic device 100 are not in the same line of sight. After activating the reflector device 200, the electronic device 100 may automatically adjust the reflector device 200 to have the angle relative to the electronic device 100 at which the view position of the user of the electronic device 100 is captured on the reflector device 200 using the image sensor 102, and the electronic device 100 may display the information of the incoming call 600 received in the electronic device 100 on the reflector device 200 that is adjusted to have the angle relative to the electronic device 100. Accordingly, event information is provided in the same line of sight of the user so that user experience may be enhanced.

Figure 7:
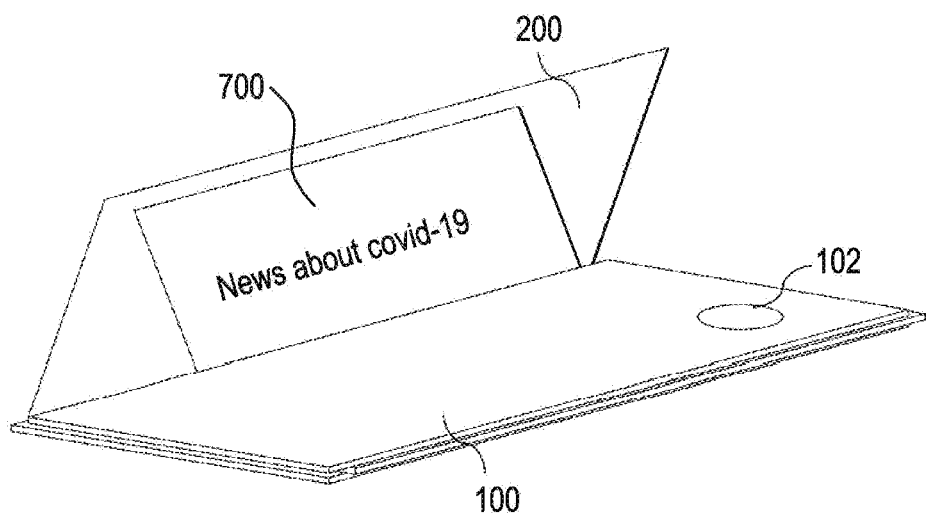
FIG. 7 illustrates an example in which an electronic device projects a news notification event on a reflector device connected to the electronic device, according to various embodiments.

FIG. 7 illustrates an example in which the electronic device 100 projects a news notification 700 on the reflector device 200 connected to the electronic device 100, according to various embodiments. In this example, it may be assumed that the angle of view of the user 300 of the electronic device 100 and the viewing angle of the electronic device 100 are not in the same line of sight and the electronic device 100 receives the news notification. According to various embodiments, upon receiving the news notification 700, the electronic device 100 may activate the reflector device 200 connected to the electronic device 100 since the reflector device 200 may be automatically activated when the angle of view of the user (e.g., the user 300 of the electronic device 100) and the viewing angle of the electronic device 100 are not in the same line of sight. After activating the reflector device 200, the electronic device 100 may automatically adjust the reflector device 200 to have the angle so that the view position of the user (e.g., the user 300 of the electronic device 100) is placed on the reflector device 200 at the angle determined by using the image sensor 102, thereby enabling the electronic device 100 to display the information (e.g., news about covid-19) of the news notification 700 received in the electronic device 100 on the reflector device 200.

Figure 8:
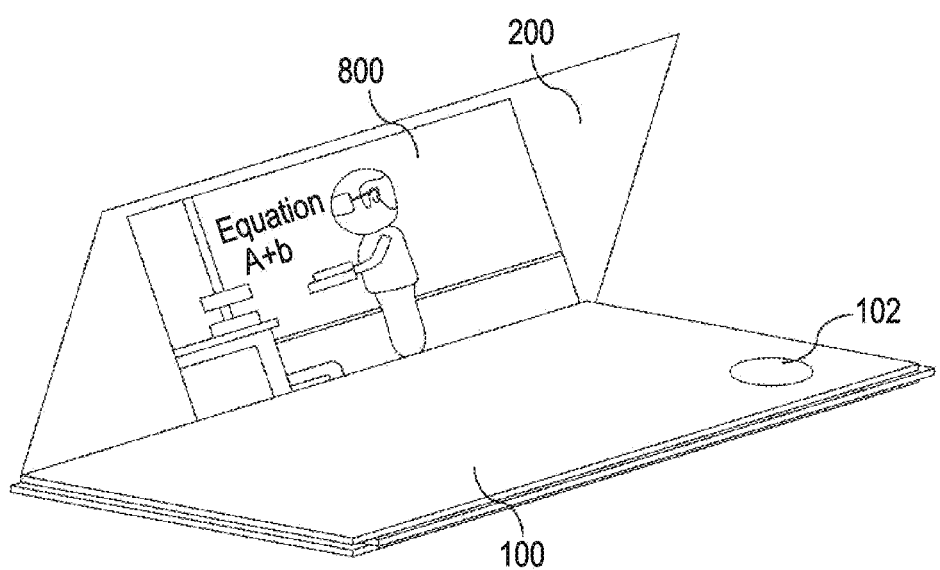
FIG. 8 illustrates an example in which an electronic device projects a video class on a reflector device connected to the electronic device, according to various embodiments.

FIG. 8 illustrates an example in which the electronic device 100 projects a video class notification 800 on the reflector device 200 connected to the electronic device 100, according to various embodiments. In this example, it may be assumed that the angle of view of the user (e.g., the user 300 of the electronic device 100) and the viewing angle of the electronic device 100 are not in the same line of sight and the electronic device 100 receives the video class notification 800. According to various embodiments, after receiving the video class notification 800, the electronic device 100 may activate the reflector device 200 connected to the electronic device 100 since the reflector device 200 may be automatically activated when the angle of view of the user (e.g., the user 300 of the electronic device 100) and the viewing angle of the electronic device 100 are not in the same line of sight. After activating the reflector device 200, the electronic device 100 may automatically adjust the reflector device 200 to have the angle so that the view position of the user (e.g., the user 300 of the electronic device 100) is place at the angle of the reflector device 200 determined by using the image sensor 102. According to various embodiments, the electronic device 100 may display the information (e.g., equation (a+b)) of the video class notification 800 received in the electronic device 100 on the reflector device 200.

Figure 9:
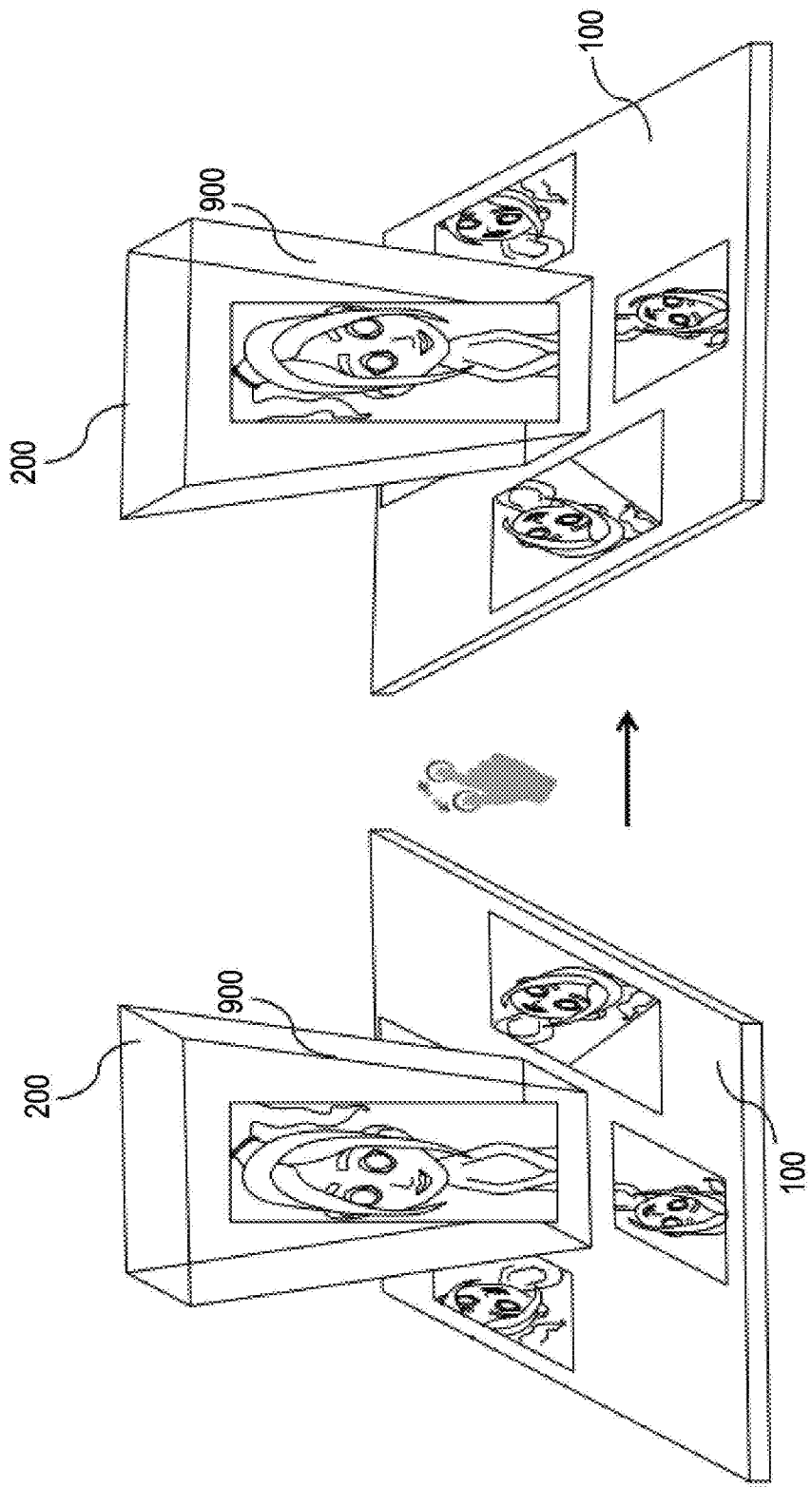
FIG. 9 illustrates an example in which an electronic device projects an image, from a gallery, on a reflector device connected to the electronic device, according to various embodiments.

FIG. 9 illustrates an example in which the electronic device 100 projects an image 900, from a gallery, on the reflector device 200 connected to the electronic device 100, according to various embodiments. In the example, it may be assumed that the angle of view of the user (e.g., the user 300 of the electronic device 100) and the viewing angle of the electronic device 100 are not in the same line of sight, and the user (e.g., the user 300 of the electronic device 100) make access to the gallery while sitting away from the electronic device 100 using a smart watch. According to various embodiments, after accessing the gallery, the electronic device 100 may activate the reflector device 200 connected to the electronic device 100 since the reflector device 200 may be automatically activated when the angle of view of the user (e.g., the user 300 of the electronic device 100) and the viewing angle of the electronic device 100 are not in the same line of sight. According to various embodiments, after activating the reflector device 200, the electronic device 100 may automatically adjust the reflector device 200 so that the view position of the user 300 of the electronic device 100 is placed on the reflector device 200 at the angle using the image sensor 102, thereby allowing the electronic device 100 to display the image 900 from the gallery on the reflector device 200. According to various embodiments, gestures of the user may be recognized using the smart watch and corresponding actions may be performed on the electronic device 100 to display their results on the reflector device 200.

Figure 10:
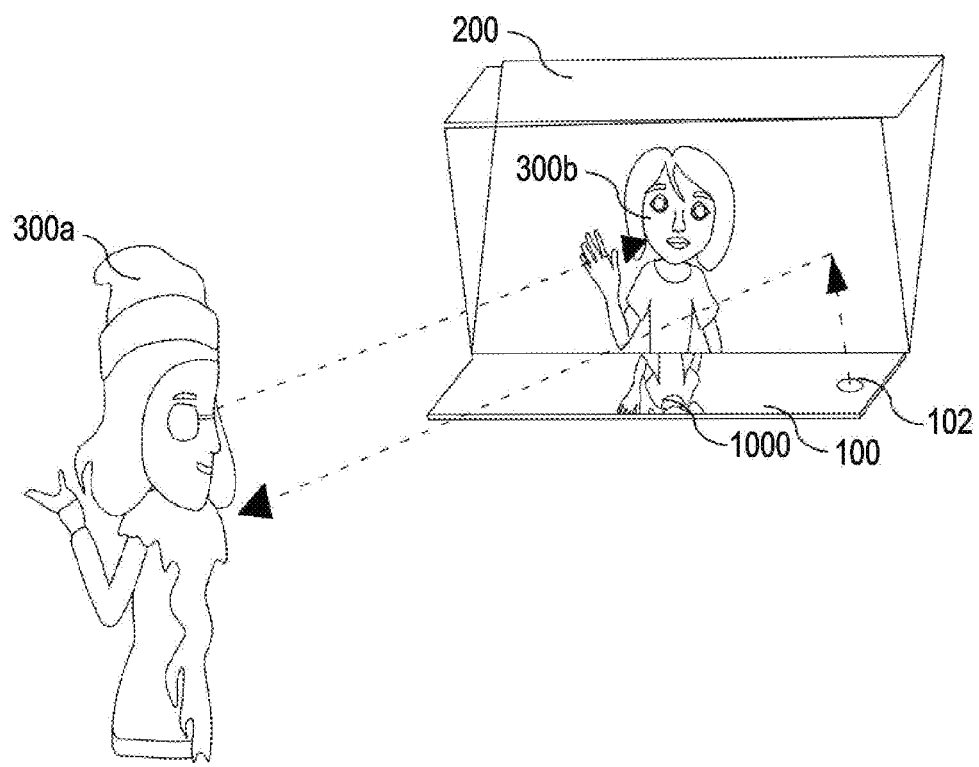
FIG. 10 illustrates an example in which an electronic device projects a video calling on a reflector device connected to the electronic device, according to various embodiments.

FIG. 10 illustrates an example in which the electronic device 100 projects a video call 1000 on the reflector device 200 connected to the electronic device 100, according to various embodiments. In this example, it may be assumed that the angle of view of the user (e.g., the user 300 of the electronic device 100) and the viewing angle of the electronic device 100 are not in the same line of sight and the electronic device 100 receives the video call on the electronic device 100. According to various embodiments, after receiving the video call 1000, the electronic device 100 may activate the reflector device 200 connected to the electronic device 100 since the reflector device 200 may be automatically activated when the angle of view of the user (e.g., the user 300 of the electronic device 100) and the viewing angle of the electronic device 100 are not in the same line of sight. According to various embodiments, after activating the reflector device 200, the electronic device 100 may automatically adjust the reflector device 200 so that the view position of the user (e.g., the user 300 of the electronic device 100) is placed at the angle on the reflector device 200 that is determined using the image sensor 102, thereby allowing the electronic device 100 to display the information (e.g., photo of another user) of the video call 100 received in the electronic device 100 on the reflector device 200.

Figure 11A:
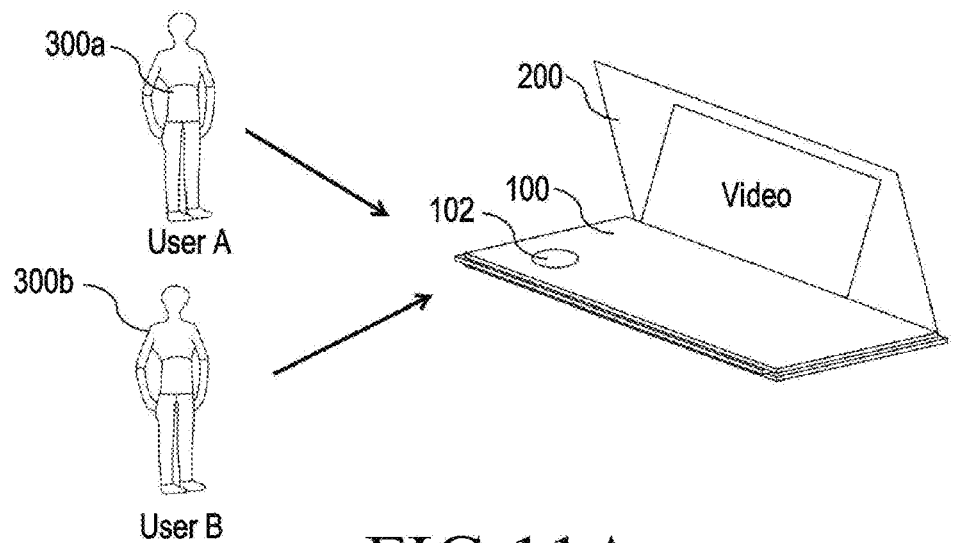
FIGS. 11A, 11B and 11C each illustrate an example in which an electronic device projects an event on a reflector device connected to the electronic device based on a context of a user, according to various embodiments.
Figure 11B:
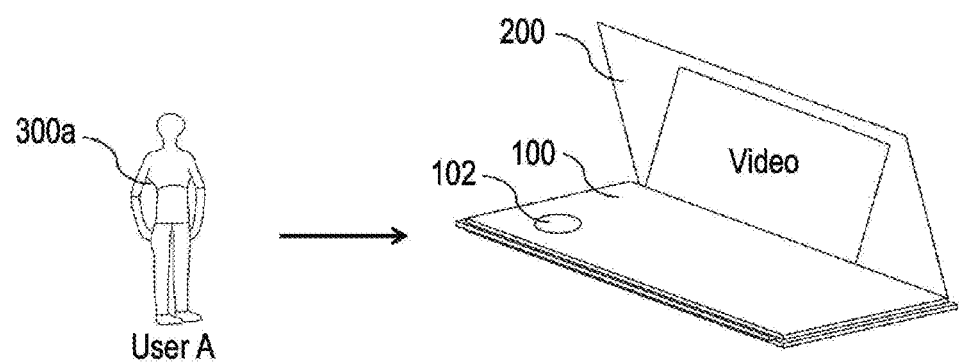
Figure 11C:
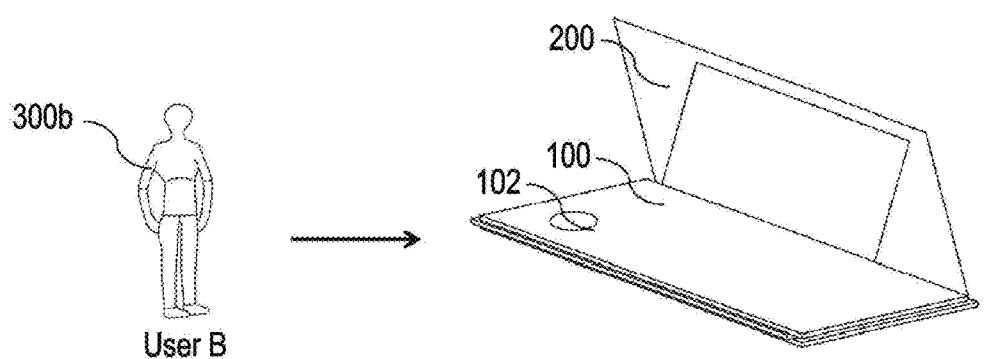

FIGS. 11A, 11B and 11C each illustrate an example in which the electronic device 100 projects the event on the reflector device 200 connected to the electronic device 100 based on the context of the user, according to various embodiments.

As shown in the FIG. 11A, it may be considered an example in which the electronic device 100 may project the video on the reflector device 200 connected to the electronic device 100 and the user (e.g., a user A 300a) of the electronic device 100 is in proximity with another user (e.g., another user B 300b). According to various embodiments, the electronic device 100 may determine the level of information of the video to be reflected on the reflector device 200 based on the context of the user that may be identified by using the authentication controller 116. Based on the determination of the level of information of the video to be reflected on the reflector device 200, the electronic device 100 may display the information of the video on the reflector device 200. For instance, as shown in the FIG. 11B, the user (e.g., the user A 300a) of the electronic device 100 is able to view the video on the reflector device 200 when there is no other user near the user A 300a, while the user (e.g., the user B 300b) other than the user A 300a of the electronic device 100 is not able to view the video on the reflector device 200 as shown in the FIG. 11C.

Figure 13A:
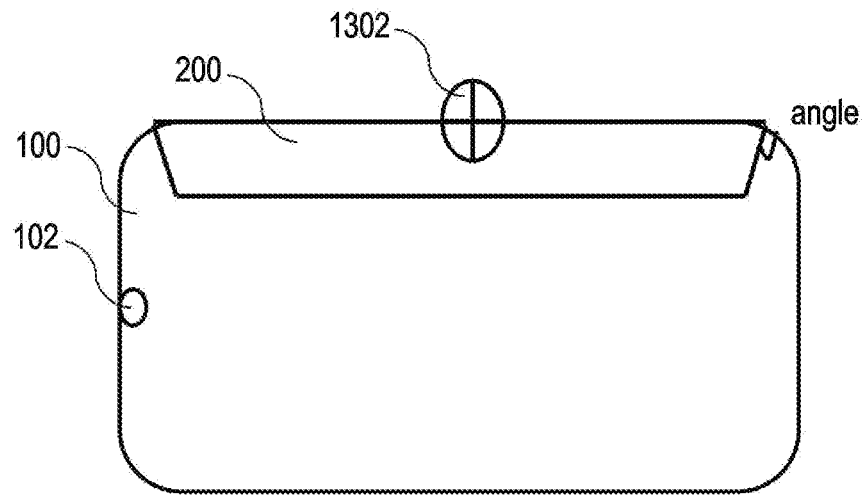
FIG. 13A illustrates a top view of an electronic device that automatically configures a reflector device at an angle at which a view position of a user of the electronic device is captured on the reflector device using a rotary motor, according to various embodiments.
Figure 13B:
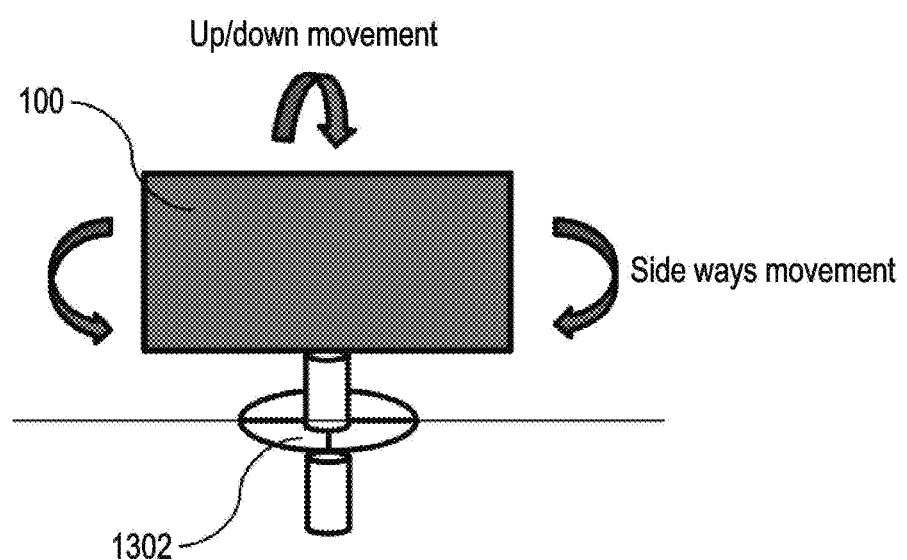
FIG. 13B illustrates a side view of an electronic device that automatically configures a reflector device at an angle at which a view position of a user of the electronic device is captured on the reflector device using a rotary motor, according to various embodiments.

FIG. 13B illustrates a top view of the electronic device 100 automatically configuring the reflector device 200 to have an angle with respect to the electronic device 100 so that the view position of the user (e.g., the user 300 of the electronic device 100) is placed at the reflector device 200 at the angle, by using a rotary motor 1302, according to various embodiments. FIG. 13B illustrates a side view of the electronic device 100 automatically configuring the reflector device 200 at an angle at which the view position of the user (e.g., the user 300 of the electronic device 100) is captured on the reflector device 200 using the rotary motor 1302, according to various embodiments.

Here, it may be considered a scenario in which the angle of view of the user (e.g., the user 300 of the electronic device 100) and the viewing angle of the electronic device 100 are not in the same line of sight and the electronic device 100 receives the incoming call on the electronic device 100. According to various embodiments, upon receiving the incoming call, vibrations of the incoming call may trigger the rotary motor 1302 to open up the reflector device 200 and the image sensor 102 may begin searching for the user (e.g., the user 300 of the electronic device 100) to detect the optimal view point of the user (e.g., the user 300 of the electronic device 100) on the reflector device 200.

The triggering of the rotary motor 1302 may be replaceable by any low energy communication mechanism which may communicate to the rotary motor 1302. The low energy communication mechanism may be, for example but not limited to, a near field communication (NFC), a vibration pattern detection mechanism, remote wearable control mechanism, Bluetooth low energy (BLE) mechanism.

In an example, the triggering of the motor 1302 to rotate may be instructed by the camera as a feedback to a motor sensor using an image processing model and a machine learning model. The feedback may be in terms of user's view positions estimated in the 2D image. Projection geometry variables (known/unknown) may provide the 3D projection values when a 2D image has been captured in the analysis process by the camera.

Figure 14A:
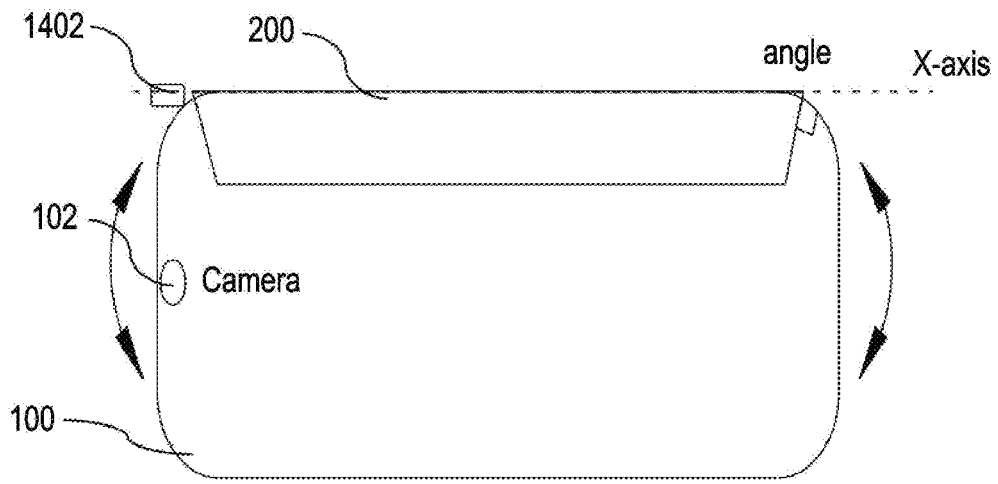
FIG. 14A illustrates a top view of an electronic device that automatically configures a reflector device at an angle at which a view position of a user of the electronic device is captured on the reflector device using a motor, according to various embodiments.
Figure 14B:
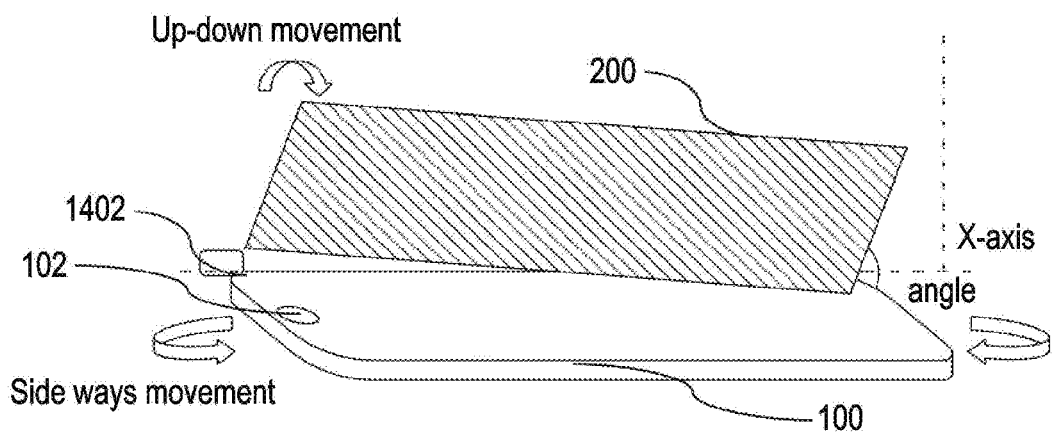
FIG. 14B illustrates a front view of an electronic device that automatically configures a reflector device at an angle at which a view position of a user of the electronic device is captured on the reflector device using a motor, according to various embodiments.

FIG. 14A illustrates a top view of the electronic device 100 automatically configuring the reflector device 200 so that the view position of the user (e.g., the user 300 of the electronic device 100) is placed on the reflector device 200 at the angle using the motor 1402, according to various embodiments. FIG. 14B illustrates a front view of the electronic device 100 automatically configuring the reflector device 200 so that the view position of the user (e.g., the user 300 of the electronic device 100) is placed at an angle captured on the reflector device 200 using the motor 1402, according to various embodiments.

Here, it may be further considered a scenario that the angle of view of the user (e.g., the user 300 of the electronic device 100) and the viewing angle of the electronic device 100 are not in the same line of sight and the electronic device 100 receives the notification message on the electronic device 100. According to various embodiments, upon receiving the notification message, vibrations of the notification message may trigger the motor 1402 to open up the reflector device 200 and the image sensor 102 may begin searching for the user (e.g., the user 300 of the electronic device 100) to detect the optimal view point of the user (e.g., the user 300 of the electronic device 100) on the reflector device 200. The motor 1402 may perform rotation of the reflector device 200 in both X and Y axis.

Figure 15A:
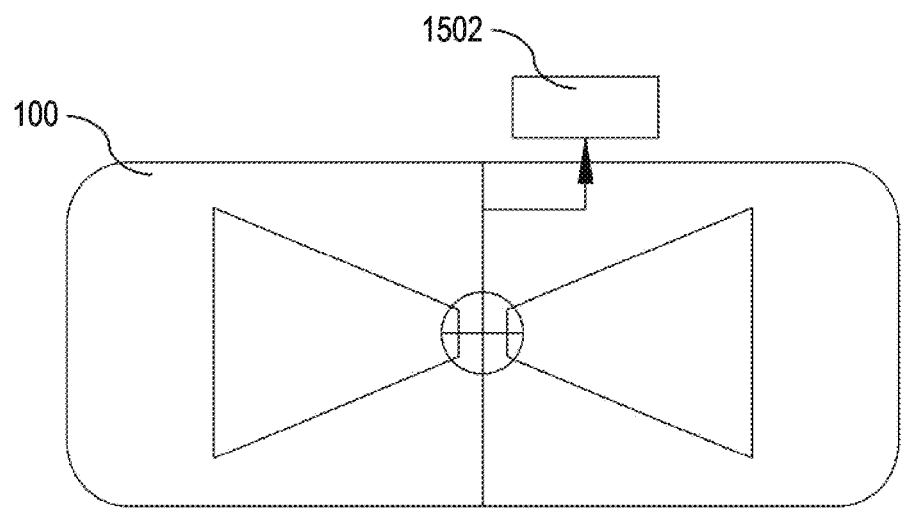
FIG. 15A illustrates a top view of an electronic device that automatically configures a reflector device at an angle at which a view position of a user of the electronic device is captured on the reflector device using a belt, according to various embodiments.
Figure 15B:
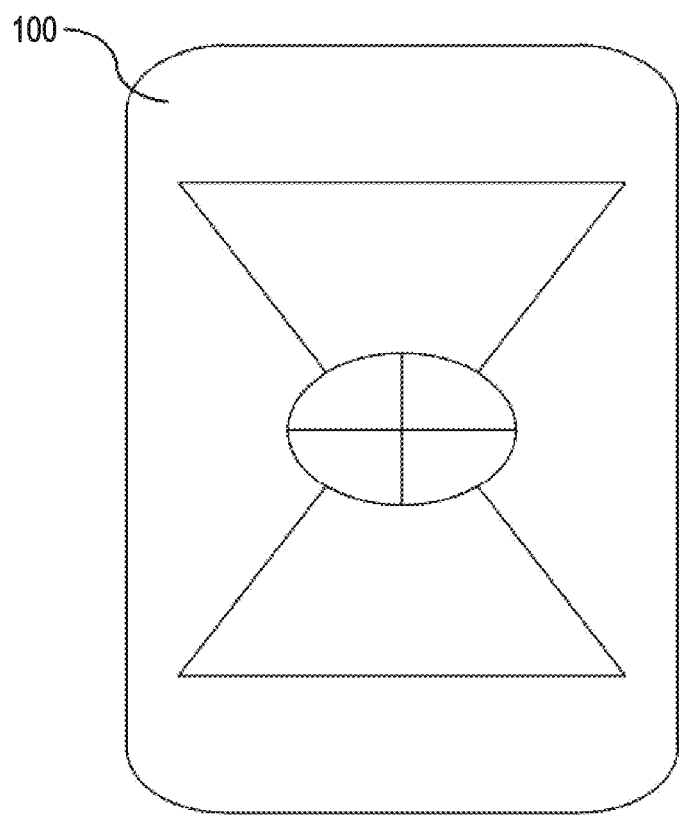
FIG. 15B illustrates a side view of an electronic device that automatically configures a reflector device at an angle at which a view position of a user of the electronic device is captured on the reflector device using a belt, according to various embodiments.

FIG. 15A illustrates a top view of the electronic device 100 automatically configuring the reflector device 200 to have an angle so that the view position of the user (e.g., the user 300 of the electronic device 100) is positioned on the reflector device 200 at the angle using a belt 1502, according to various embodiments. FIG. 15B illustrates a side view of the electronic device 100 automatically configuring the reflector device 200 so that the view position of the user (e.g., the user 300 of the electronic device 100) is positioned on the reflector device 200 at the angle using the belt 1502, according to various embodiments.

According to various embodiments, it may be considered a scenario that the reflector device 200 may be attached to the belt 1502 and the belt 1502 to connect with the NFC capable of instructing the motor (not shown) for valid rotation of the reflector device 200, so that the electronic device 100 may automatically configure the reflector device 200 to position the view position of the user of the electronic device 100 on the reflector device 200 at the angle using the belt 1502. In another example, BLE connection from a remote wearable device is also possible to perform manual operation from remote place for valid rotation of the reflector device 200.

Figure 16A:
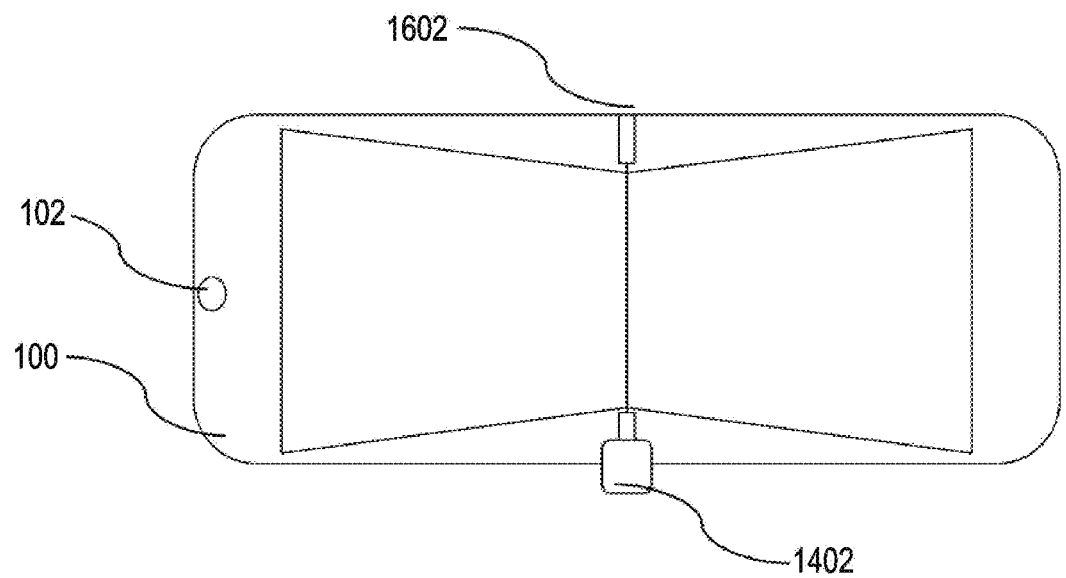
FIG. 16A illustrates a top view of an electronic device that automatically configures a reflector device at an angle at which a view position of a user of the electronic device is captured on the reflector device using a hinge, according to various embodiments.
Figure 16B:
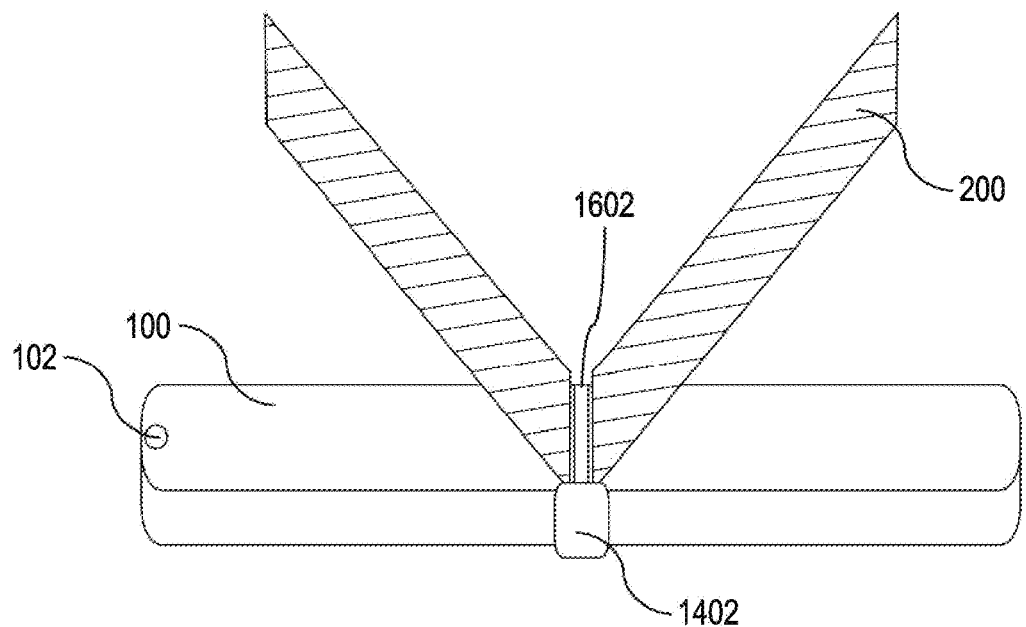
FIG. 16B illustrates a side view of the electronic device that automatically configures a reflector device at an angle at which a view position of a user of the electronic device is captured on the reflector device using a hinge, according to an embodiment.

FIG. 16A illustrates a top view of the electronic device 100 automatically configuring the reflector device 200 so that the view position of the user (e.g., the user 300 of the electronic device 100) is positioned on the reflector device 200 at the angle using a hinge 1602, according to various embodiments. FIG. 16B illustrates a side view of the electronic device 100 automatically configuring the reflector device 200 so that the view position of the user (e.g., the user 300 of the electronic device 100) is positioned on the reflector device 200 at the angle using the hinge 1602, according to various embodiments.

According to various embodiments, it may be considered a scenario that the reflector device 200 may be attached to the hinge 1602 and the hinge 1602 may be connected with the NFC (not shown) which may instruct the motor 1402 for valid rotation of the reflector device 200. According to various embodiments, the electronic device 100 may automatically configure the reflector device 200 so that the view position of the user (e.g., the user 300 of the electronic device 100) is placed on the reflector device 200 at the angle using the hinge 1602 and the motor 1402.

Figure 17A:
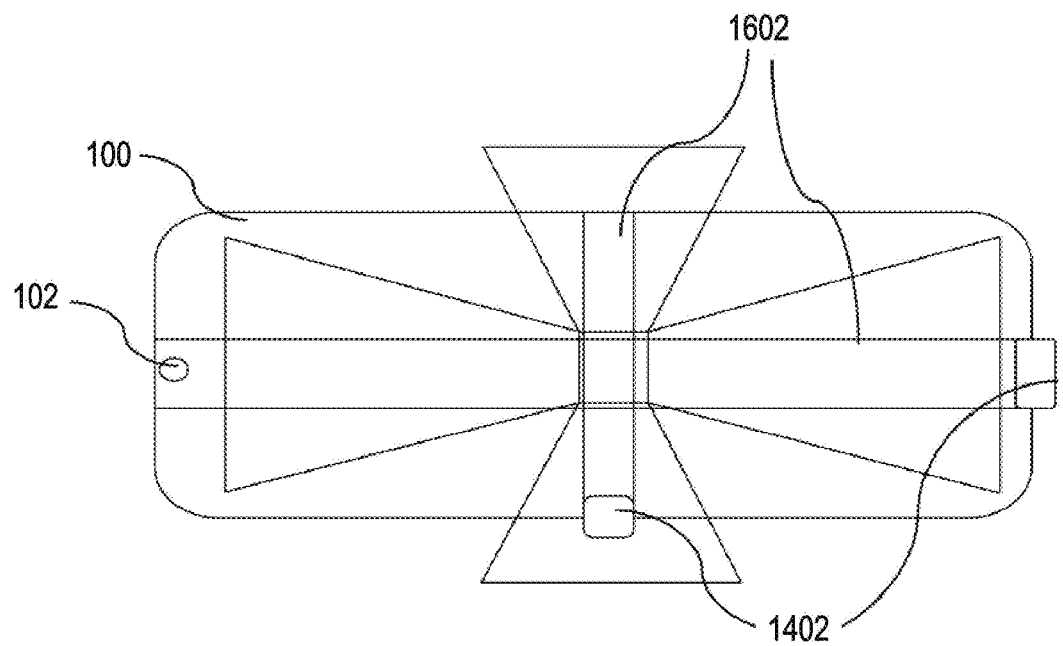
FIG. 17A illustrates a top view of the electronic device that automatically configures a reflector device at an angle at which a view position of a user of the electronic device is captured on the reflector device using a hinge and a motor, according to various embodiments.
Figure 17B:
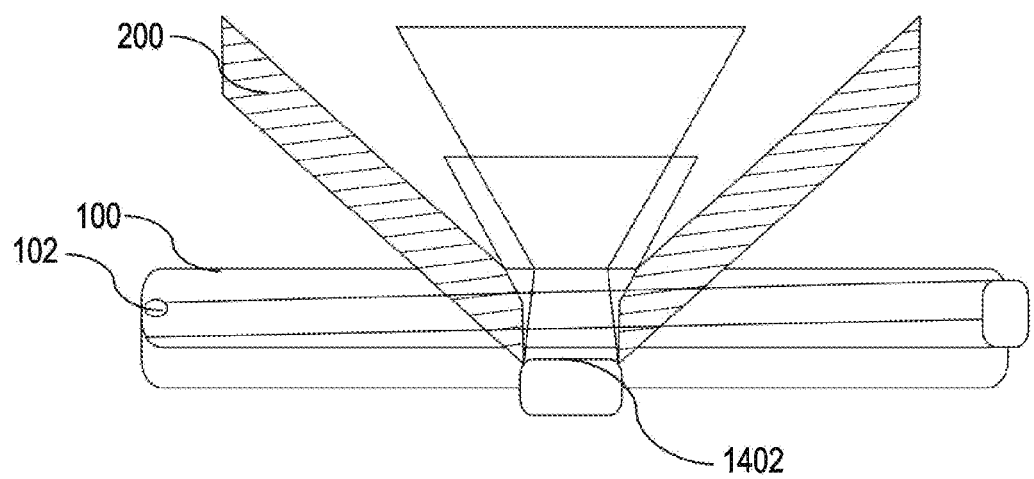
FIG. 17B illustrates a side view of the electronic device that automatically configures a reflector device at an angle at which a view position of a user of the electronic device is captured on the reflector device using a hinge and a motor, according to various embodiments.

FIG. 17A illustrates a top view of the electronic device 100 automatically configuring the reflector device 200 so that the view position of the user (e.g., the user 300 of the electronic device 100) is place on the reflector device 200 at the angle using the hinge 1602 and the motor 1402, according to various embodiments. FIG. 17B illustrates a side view of the electronic device 100 automatically configuring the reflector device 200 so that the view position of the user (e.g., the user 300 of the electronic device 100) is placed on the reflector device 200 at the angle using the hinge 1602 and the motor 1402, according to various embodiments.

According to various embodiments, the reflector device 200 may be attached to the hinge 1602 and the hinge 1602 may be connected with the vibration pattern detection mechanism (not shown) which may instruct the motor 1402 for valid rotation of the reflector device 200, so that the electronic device 100 may automatically configure the reflector device 200 to place the view position of the user (e.g., the user 300 of the electronic device 100) on the reflector device 200 at the angle by using the hinge 1602 and the motor 1402.

Figure 18A:
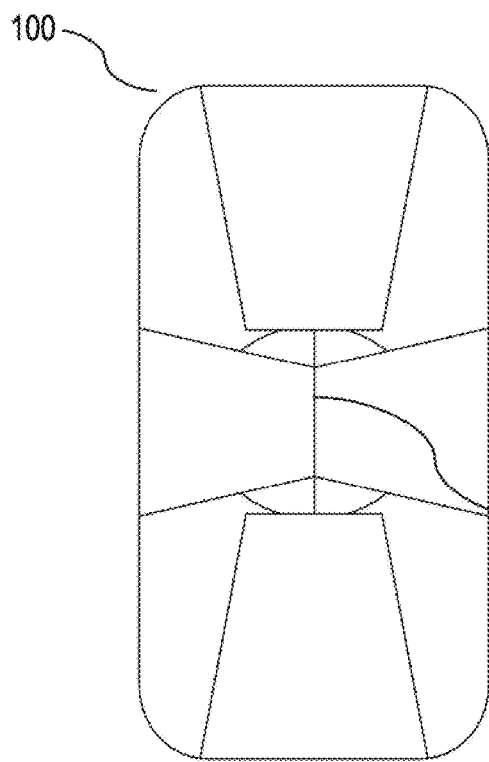
FIGS. 18A, 18B and 18C each illustrate a top view of the electronic device that automatically configures a reflector device at an angle at which a view position of a user of the electronic device is captured on the reflector device using a pulley, according to various embodiments.
Figure 18B:
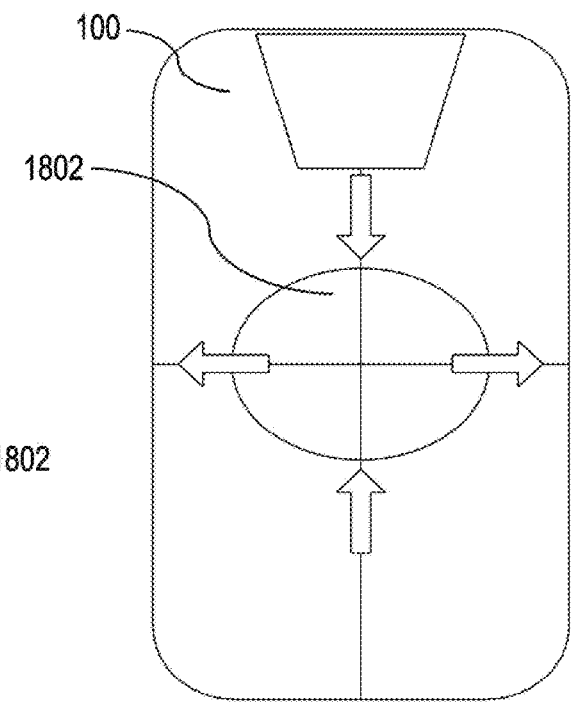
Figure 18C:
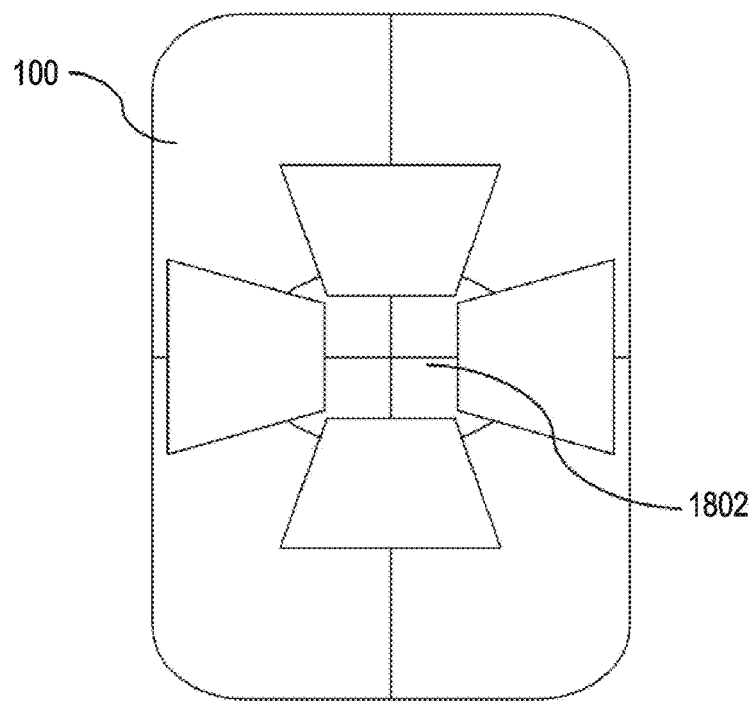

FIGS. 18A, 18B and 18C each illustrate a top view of the electronic device 100 automatically configuring the reflector device 200 so that the view position of the user (e.g., the user 300 of the electronic device 100) is place on the reflector device 200 at the angle using a pulley 1802, according to various embodiments. According to various embodiments, the reflector device 200 may be attached to the pulley 1802 and the pulley 1802 may be connected with the vibration pattern detection mechanism (not shown) capable of instructing the motor 1402 for valid rotation of the reflector device 200, so that the electronic device 100 may automatically configure the reflector device 200 to place the view position of the user (e.g., the user 300 of the electronic device 100) on the reflector device 200 at the angle using the pulley 1802.

In another example, the reflector device 200 is attached to a charging pad (not shown) and the charging pad is connected with the vibration pattern detection mechanism (not shown) which may instruct the charging pad for valid rotation of the reflector device 200, so that the electronic device 100 may automatically configure the reflector device 200 to place the view position of the user (e.g., the user 300 of the electronic device 100) on the reflector device 200 at the angle using the charging pad.

The embodiments may be implemented using at least one software program running on at least one hardware device and performing network management functions to control the elements.

The disclosure may be implemented as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g.; data transmission through the Internet). The computer-readable recording medium can be distributed over a plurality of computer systems connected to a network so that a computer-readable code is written thereto and executed therefrom in a decentralized manner. Functional programs, codes, and code segments for implementing the disclosure may be easily deduced by programmers of ordinary skill in the art.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

As discussed above, one or more embodiments of the disclosure may activate the reflector device connected to the electronic device after detecting an event in the electronic device. For example, the reflector device may be automatically activated when an angle of view of a user of the electronic device and the viewing angle of the electronic device are not in same line of sight. According to various embodiments, after activating the reflector device, the electronic device automatically adjusts the reflector device at the angle at which a view position of the user of the electronic device is captured on the reflector device using an image sensor, such that the electronic device may display the information (e.g., event information) associated with the event received in the electronic device on the reflector device. Further, according to various embodiments, the above electronic device and method may make it possible to enhance the user experience without using any additional hardware elements. In addition, according to various embodiments, the user may easily view the event without lifting the electronic device, and immersive experience may be obtained for identifying the corresponding event with cheapest of setup.

The foregoing description of the example embodiments will so fully reveal the general nature of the embodiments that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments have been described in terms of example embodiments, those skilled in the art will recognize that the embodiments may be practiced with modification within the spirit and scope of the embodiments as described herein.

What is claimed:

1. A method for operating an electronic device including at least one processor, a display, and at least one reflector device, the method being performed by the at least one processor and comprising:

based on detection of an event in the electronic device and based on an angle of view of a user being out of a viewing angle of the electronic device, automatically activating a motor to rotate the at least one reflector device, which is connected to the electronic device and is currently at a first position with respect to the electronic device, to move around the electronic device, wherein the at least one reflector device has a surface that extends in a longitudinal direction parallel to the display such that, when the at least one reflector device is placed parallel to the display, the surface of the at least one reflector device covers at least a portion of the display;

automatically activating at least one image sensor of the electronic device;

capturing at least one image frame of a reflection projected on the at least one reflector device;

determining whether an image of the user is included in the captured at least one image frame;

controlling the motor to rotate the at least one reflector device to move from the first position to a second position based on the determination, the second position having an angle with respect to the electronic device such that a view position of the user is placed on the at least one reflector device; and controlling to display, on the display of the electronic device, event information associated with the detected event to be reflected to the surface of the at least one reflector device.

2. The method as claimed in claim 1, further comprising:

based on a determination that the image of the user is included in the captured at least one image frame, determining a second angle of the at least one reflector device, with respect to the electronic device, at which the view position of the user is captured in the at least one reflector device; and configuring the at least one reflector device based on the second angle.

3. The method as claimed in claim 1, further comprising:

based on a determination that the image of the user is not included in the captured at least one image frame, modifying a position of the at least one reflector device; and capturing at least one another image frame of the reflection projected on the at least one reflector device at the modified position, determining a second angle of the at least one reflector device, with respect to the electronic device, at which a reflection of the user is captured on the at least one reflector device, and configuring the at least one reflector device based on the second angle.

4. The method as claimed in claim 2, wherein the determining the second angle comprises:

estimating a view projection contour of at least one body part of the user by using a machine learning model;

estimating a projection location of the at least one body part of the user by using the machine learning model; and determining the second angle based on the estimated view projection contour and the estimated projection location.

5. The method as claimed in claim 1, wherein the controlling to display the event information comprises:

determining a display area of the display on which the event information is to be displayed on the at least one reflector device; and displaying the event information at the determined display area of the display.

6. The method as claimed in claim 5, further comprising reflecting the displayed event information in the display area to the at least one reflector device.

7. The method as claimed in claim 6, wherein the displaying the event information comprises:

identifying at least one context information of the user;

determining a level of the event information to be reflected on the at least one reflector device based on the at least one context information of the user; and displaying the level of the event information on the display area of the display.

8. The method as claimed in claim 7, wherein the identifying the at least one context information comprises identifying the at least one context information based on at least one of a presence of another user in proximity to the user, a relation between the user and the other user, a type of the event received at the electronic device, a location of the user, a location of the electronic device, or a preference of the user.

9. An electronic device comprising:

a display;

at least one image sensor;

at least one reflector device configured to rotate with respect to the display, wherein the at least one reflector device has a surface that extends in a longitudinal direction parallel to the display such that, when the at least one reflector device is placed parallel to the display, the surface of the at least one reflector device covers at least a portion of the display;

at least one memory configured to store instructions; and at least one processor configured to execute the instructions to:

based on detection of an event in the electronic device and based on an angle of view of a user being out of a viewing angle of the electronic device, automatically activate a motor to rotate the at least one reflector device, which is connected to the electronic device and is currently at a first position with respect to the electronic device, to move around the electronic device;

automatically activate the at least one image sensor;

control the at least one image sensor to capture at least one image frame of a reflection projected on the at least one reflector device;

determine whether an image of the user is included in the captured at least one image frame;

control the motor to rotate the at least one reflector device to move from the first position to a second position based on the determination, the second position having an angle with respect to the electronic device such that a view position of the user is placed on the at least one reflector device; and control the display to display event information associated with the event to be reflected to the surface of the at least one reflector device.

10. The electronic device as claimed in claim 9, wherein the at least one processor is further configured to execute the instructions to:

based on a determination that the image of the user is included in the captured at least one image frame, determine a second angle of the at least one reflector device, with respect to the electronic device, at which the view position of the user is captured in the at least one reflector device; and control to configure the at least one reflector device based on the second angle.

11. The electronic device as claimed in claim 9, wherein the at least one processor is further configured to execute the instructions to:

based on a determination that the image of the user is not included in the captured at least one image frame, modify a position of the at least one reflector device such that the reflection of the user is captured on the at least one reflector device;

capture at least one another image frame of a reflection projected on the at least one reflector device at the modified position;

determine a second angle of the at least one reflector device, with respect to the electronic device, at which a reflection of the user is captured in the at least one reflector device; and control to configure the at least one reflector device based on the second angle.

12. The electronic device as claimed in claim 10, wherein the at least one processor is further configured to execute the instructions to:

estimate a view projection contour of at least one body part of the user by using a machine learning model;

estimate a projection location of the at least one body part of the user by using the machine learning model; and determine the second angle based on the estimated view projection contour and the estimated projection location.

13. The electronic device as claimed in claim 9, wherein the at least one processor is further configured to execute the instructions to:

determine a display area of the display on which the event information received in the electronic device is to be displayed; and display the event information on the determined display area of the display.

14. The electronic device as claimed in claim 13, wherein the at least one processor is further configured to execute the instructions to:

reflect the displayed event information in the display area to the at least one reflector device.

15. The electronic device as claimed in claim 14, wherein the at least one processor is further configured to execute the instructions to:

detect at least one context information of the user;

determine a level of the event information to be reflected on the at least one reflector device based on the at least one context information of the user; and display the level of the event information on the display area of the display.

16. The electronic device as claimed in claim 15, wherein the at least one processor is further configured to execute the instructions to determine the at least one context information of the user based on at least one of a presence of another user in proximity to the user of the electronic device, a relation between the user of the electronic device and the other user, a type of the event received at the electronic device, a location of the user of the electronic device, a location of the electronic device, or a preference of the user of the electronic device.

* * * * *